United States Patent
Ebeling et al.

(10) Patent No.: US 10,506,316 B2
(45) Date of Patent: Dec. 10, 2019

(54) OUTLET RECEPTACLE COVER AND MODE THROTTLING SYSTEM

(71) Applicants: Cordell Eldred Ebeling, Isanti, MN (US); Eric F. Little, Eden Prairie, MN (US)

(72) Inventors: Cordell Eldred Ebeling, Isanti, MN (US); Eric F. Little, Eden Prairie, MN (US)

(73) Assignee: Cordell Eldred Ebeling, Isanti, MN (US)

( * ) Notice: Subject to any disclaimer, the term of this patent is extended or adjusted under 35 U.S.C. 154(b) by 0 days.

(21) Appl. No.: 15/442,679

(22) Filed: Feb. 26, 2017

(65) Prior Publication Data

US 2017/0251289 A1 Aug. 31, 2017

Related U.S. Application Data

(60) Provisional application No. 62/300,536, filed on Feb. 26, 2016.

(51) Int. Cl.
*H04R 1/02* (2006.01)
*H02G 3/14* (2006.01)
(Continued)

(52) U.S. Cl.
CPC .............. *H04R 1/028* (2013.01); *G08B 5/36* (2013.01); *H02G 3/14* (2013.01); *H04N 7/183* (2013.01); *H04R 1/023* (2013.01); *H04R 29/00* (2013.01); *H04R 1/2803* (2013.01); *H04R 1/323* (2013.01); *H04R 1/403* (2013.01); *H04R 7/045* (2013.01); *H04R 7/26* (2013.01); *H04R 2201/021* (2013.01); *H04R 2201/028* (2013.01); *H04R 2201/029* (2013.01); *H04R 2420/07* (2013.01); *H04R 2440/05* (2013.01); *H04R 2460/03* (2013.01); *H04W 4/80* (2018.02)

(58) Field of Classification Search
None
See application file for complete search history.

(56) References Cited

U.S. PATENT DOCUMENTS 3,383,057 A * 5/1968 Jepsen .................... B03D 1/02
209/11
5,465,198 A * 11/1995 Kellogg ................... F21S 8/035
362/253
(Continued)

FOREIGN PATENT DOCUMENTS

EP 0994536 A1 * 4/2000 ........... H01R 31/065

*Primary Examiner* — Curtis A Kuntz
*Assistant Examiner* — Kenny H Truong
(74) *Attorney, Agent, or Firm* — Merchant & Gould P.C.

(57) ABSTRACT

In non-limiting examples of the present disclosure, an electrical receptacle is provided. A first transmission tab configured to be electrically connected to a neutral terminal of the electrical receptacle is provided. A second transmission tab configured to be electrically connected to a live terminal of the electrical is provided. A speaker device in electrical communication with the first and second transmission tabs and a speaker grille cover secured to the receptacle cover are also provided. Other examples of the present disclosure relate to systems, methods and devices for influencing resonant modes of one or more vibrating surface, including a mode throttling device and an exciter device.

21 Claims, 20 Drawing Sheets

(51) Int. Cl.
  *G08B 5/36*    (2006.01)
  *H04N 7/18*    (2006.01)
  *H04R 29/00*   (2006.01)
  *H04W 4/80*    (2018.01)
  *H04R 1/28*    (2006.01)
  *H04R 1/32*    (2006.01)
  *H04R 1/40*    (2006.01)
  *H04R 7/04*    (2006.01)
  *H04R 7/26*    (2006.01)

(56) References Cited

U.S. PATENT DOCUMENTS

| | | | |
|---|---|---|---|
| 6,423,900 B1* | 7/2002 | Soules | H01H 9/185 174/66 |
| 6,457,843 B1* | 10/2002 | Kester | F21V 33/0076 362/186 |
| 7,818,037 B2* | 10/2010 | Lair | H04M 1/6066 381/370 |
| 2004/0264730 A1* | 12/2004 | Combest | H04R 1/023 381/391 |
| 2006/0177088 A1* | 8/2006 | Howard | H04R 1/023 381/391 |
| 2007/0092088 A1* | 4/2007 | Chang | H04R 1/025 381/79 |
| 2008/0129498 A1* | 6/2008 | Howarter | G08B 3/10 340/541 |
| 2008/0265677 A1* | 10/2008 | Chiang | H01R 13/6683 307/38 |
| 2009/0025955 A1* | 1/2009 | McBain | H01R 13/443 174/67 |
| 2013/0032594 A1* | 2/2013 | Smith | H02G 3/14 220/241 |

* cited by examiner

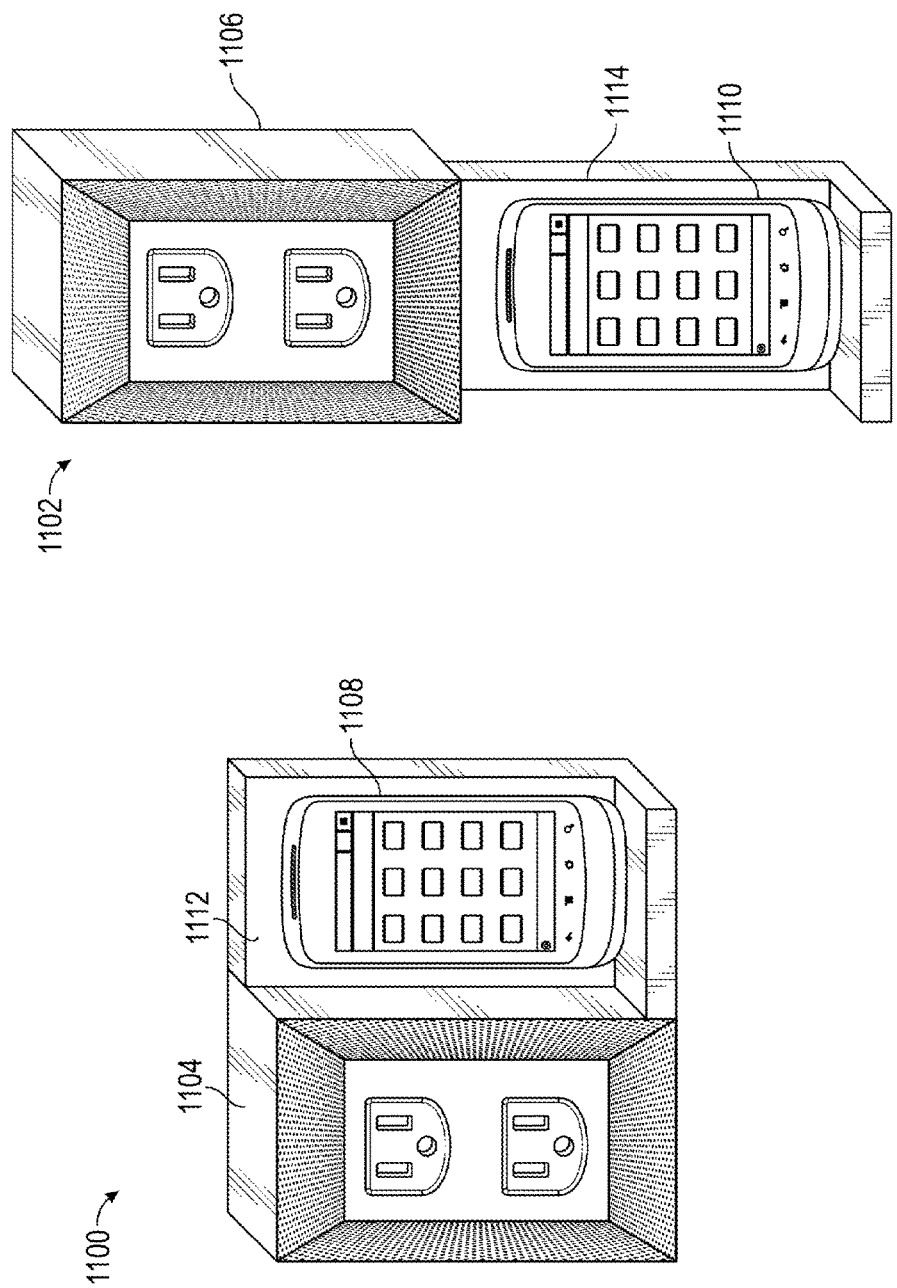

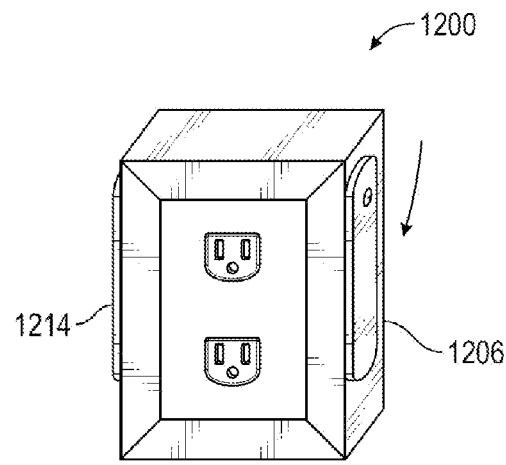
FIG. 12A
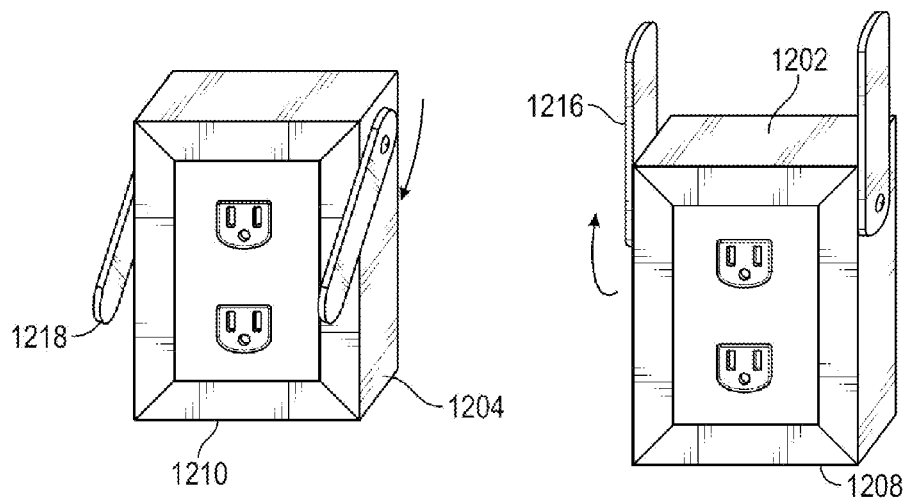
FIG. 12B
FIG. 12C

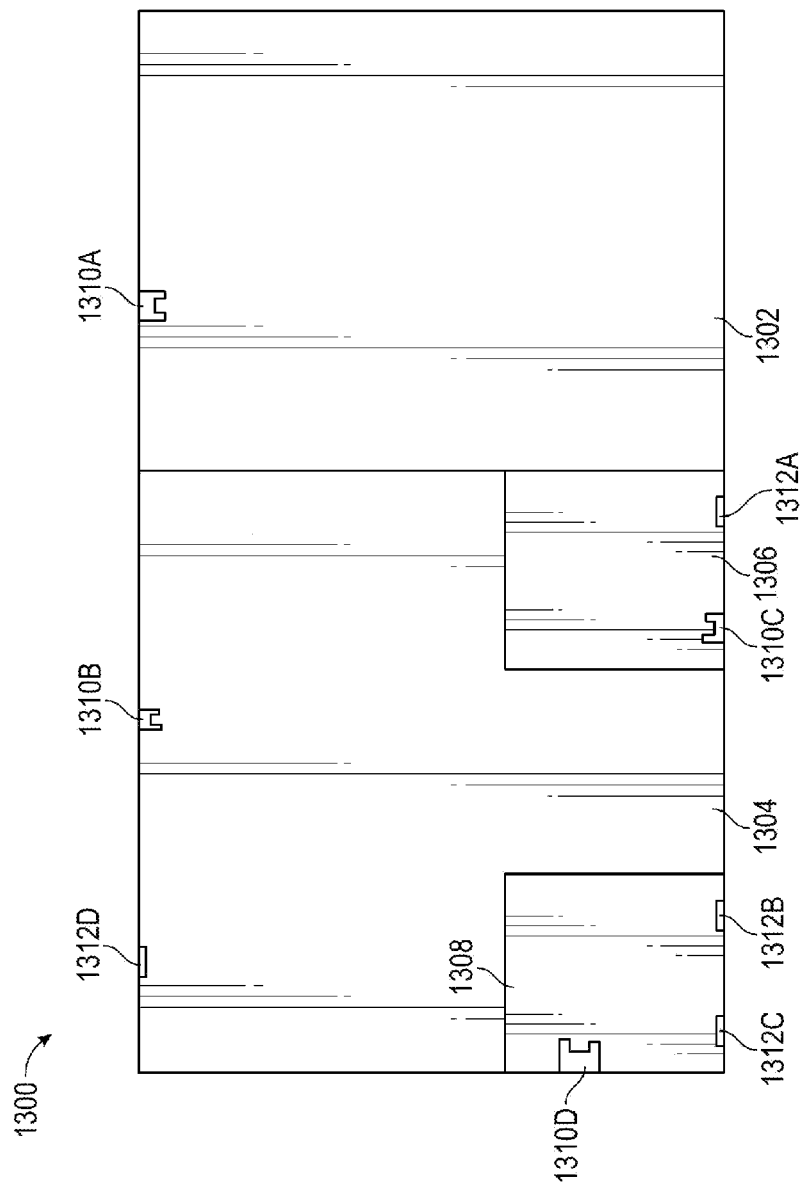

2100

OUTLET RECEPTACLE COVER AND MODE THROTTLING SYSTEM

CROSS-REFERENCE TO RELATED APPLICATIONS

This application claims the benefit of U.S. Provisional Patent Application Ser. No. 62/300,536, entitled "OUTLET RECEPTACLE COVER", filed Feb. 26, 2016, the entirety of which is hereby incorporated by reference.

BACKGROUND

Installations of home intercom systems can cost thousands of dollars and generally requires professional electricians to implement. Home surround sound system and video/audio security system installation is also expensive, can take days to accomplish and may also require professional electricians to implement and safely configure. For this reason many home owners find the convenience of non-hardwired Bluetooth speakers and video devices to be a reasonable alternative to structurally hardwired electrically integrated speaker and video systems. However, those systems and devices must either be charged, requiring one or more power cords, or batteries that must be changed out periodically.

Thus, what is needed is an improved receptacle/switch cover that is easy to install for the do-it-yourself consumer and which also provides the functionality provided by surround sound systems as well as video/audio security surveillance systems designed for in or outdoor use.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

In general terms, aspects of this disclosure are directed to an electrical receptacle cover comprising: a first transmission tab configured to be electrically connected to neutral terminal of the receptacle; a second transmission tab configured to be electrically connected to a live terminal of the electrical receptacle; a speaker device in electrical communication with the first and second transmission tabs; and a speaker grille cover secured to the receptacle cover.

Additional aspects of this disclosure are directed to a system comprising: a mode throttling device in contact with a vibrating surface, the mode throttling device comprising: an adjustable mass component; and an adjustable stiffness component located between the adjustable mass component and the vibrating surface; and an exciter device in communication with the vibrating surface, wherein the mode throttling device is remotely located from the exciter device and the mode throttling device influences resonant modes of the vibrating surface energized with the exciter device.

BRIEF DESCRIPTION OF THE DRAWINGS

FIG. 11 depicts two simplified diagrams of an electrical receptacle cover integrated with an inductive charger and a mobile computing device.

FIGS. 12A-12C depict three simplified diagrams of an electrical receptacle cover integrated with radio frequency (RF) extenders.

FIG. 13 is a basic diagram of a building in which one or more electrical receptacle covers, and their corresponding RF extenders, may be implemented according to the current disclosure.

DETAILED DESCRIPTION

Figure 1:
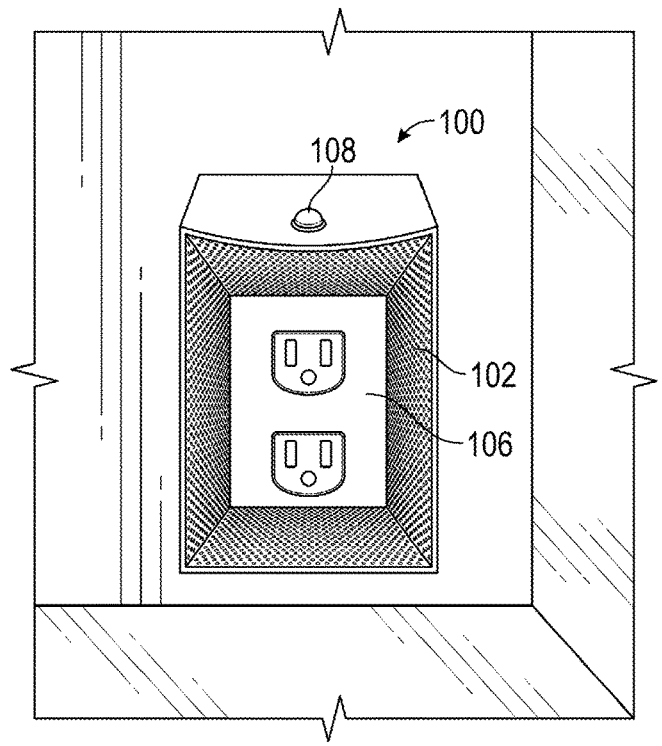
FIG. 1 is a front perspective view of an electrical receptacle cover and its speaker grille cover joined to an electrical receptacle on a wall.

Various aspects of the current disclosure will be described in detail with reference to the drawings, wherein like reference numerals represent like parts and assemblies throughout the several views. Reference to various aspects and/or embodiments does not limit the scope of the claims attached hereto. Additionally, any examples set forth in this specification are not intended to be limiting and merely set forth some of the many possible aspects in which the appended claims may be practiced.

FIG. 1 depicts one example of an electrical receptacle cover 100 attached to an electrical receptacle on a wall according to one aspect of the present disclosure. Electrical receptacle cover 100 has speaker apertures 102 and a light 108. Electrical receptacle cover 100 also has a flat faceplate 106, which covers the cover plate mounting screw of a standard electrical receptacle cover plate.

The speaker apertures 102 may amplify and direct sound from speakers 310 integrated in electrical receptacle cover 300 discussed with reference to FIG. 3, which may be wired directly to other devices within a building, such as with a traditional intercom system. Additionally and alternatively, the electrical receptacle cover 100 may utilize various communications signals, such as Bluetooth and WiFi technologies, such that it may communicate with other devices having wireless communication capabilities. According to aspects a user may sync a smart phone and otherwise be configured to communicate with, a vital body mattress, body monitoring and fitness tracking devices, temperature and heart rate sensors, a tablet, sound and motion sensors, vibration sensors, smoke sensors, touch sensors, a smart TV, induction chargers, USB ports, and/or a doorbell to the electrical receptacle cover 100 and perform a variety of functions in combination with these devices. Each of these devices may be voice activated and/or controlled utilizing an integrated microphone in the electrical receptacle cover as more fully discussed with reference to FIG. 6.

The electrical receptacle cover 100 may provide notifications to a user that a doorbell is ringing by communicating with the doorbell using wired or wireless communications means. For example, an electrical receptacle cover 100 may be utilized in a basement or other location in a building where a doorbell is unlikely to be heard. The doorbell may send a wired or wireless signal to the electrical receptacle cover 100 when it is rung and the electrical receptacle cover 100 may provide a notification that the doorbell has been rung such as a sound output from a speaker (not shown) within the electrical receptacle cover 100, a flashing of the light 108, changing the color projected by the light 108, or other suitable means. This feature may be especially useful to individuals with hearing disabilities in that a doorbell can be cheaply and easily modified to provide communicate with the electrical receptacle cover 100 and direct it to project non-audible cues that a doorbell has been rung.

Figure 2:
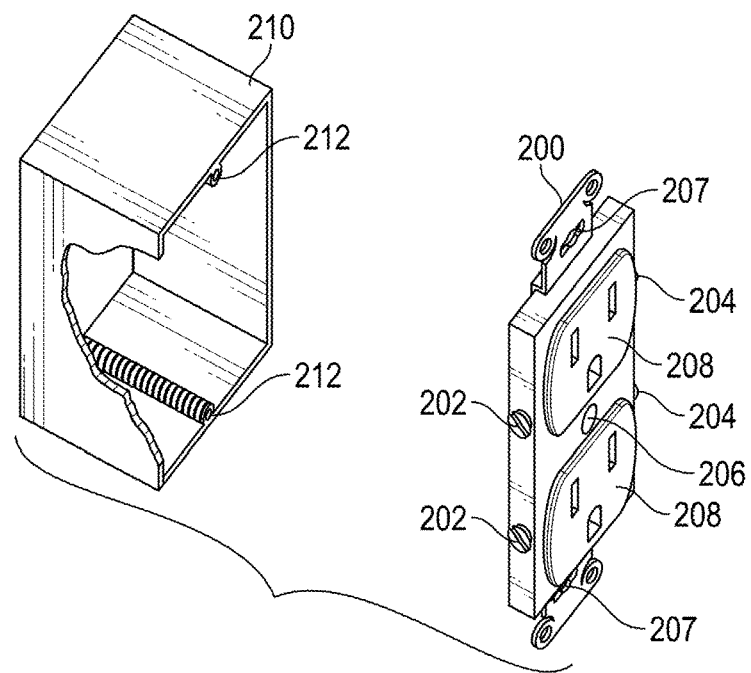
FIG. 2 is a front perspective exploded view of an electrical receptacle and a receptacle box.

FIG. 2 is a front perspective exploded view of an electrical receptacle 200 and a receptacle box 210. Electrical receptacle has neutral terminals 202, live terminals 204, cover plate mounting screw aperture 206 and outlets 208. A cover plate is generally attached to electrical receptacle 200 as an added safety feature such that structure owners and their guests will not come into contact with electrical wires or their corresponding terminals, which could lead to electric shock, serious injury and/or death. Cover plates also provide a more aesthetically pleasing alternative to an open electrical receptacle 200, although they generally do not add functionality to the electrical receptacle 200. Receptacle box 210 has electrical receptacle mounting apertures 212 for fastening electrical receptacle 200 to receptacle box 210.

Figure 3:
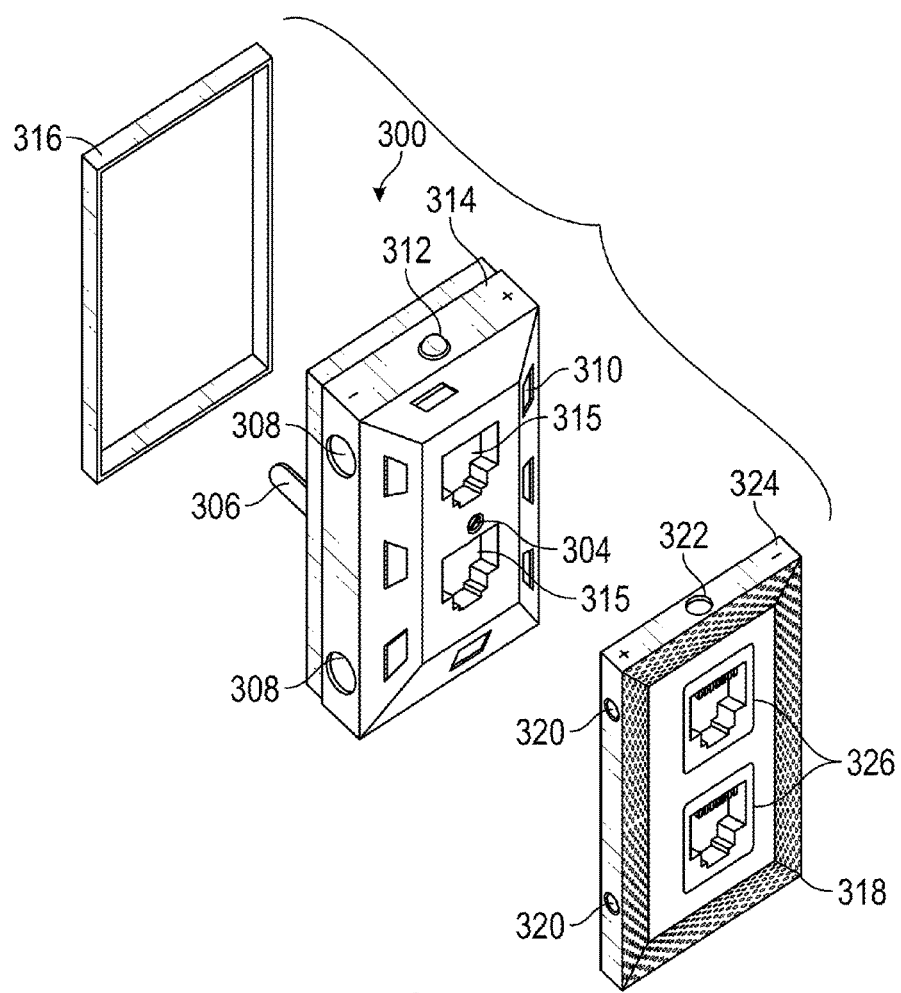
FIG. 3 is a front perspective exploded view of an electrical receptacle cover.

Turning to FIG. 3 a front perspective exploded view of receptacle box gasket 316, electrical receptacle cover 300 and speaker grille cover 318 is provided. Receptacle box gasket 316 may be attached to, or separated from electrical receptacle cover 300 and snugly fits the interior surface contours of a receptacle box such as receptacle box 110 depicted in FIG. 2 and provides a seal between an electrical receptacle and a receptacle box, maximizing the forward sound projection into the room or area facing the front of the electrical receptacle cover 300 as well as minimizing the sound projection back into the wall so as to prevent unwanted noise in other areas of a structure.

The combination of receptacle box gasket 316 and electrical receptacle cover 300 may also create an apparatus that provides enhanced base sound by utilizing interior wall cavity volume of surrounding electrical receptacle installation.

Electrical receptacle cover 300 may include a cover plate mounting screw aperture 304 for mounting electrical receptacle cover 300 to an electrical receptacle via a cover plate mounting screw aperture such as cover plate mounting screw aperture 206 depicted in FIG. 2. Electrical receptacle cover 300 may also include transmission tabs such as transmission tabs 306, which are fitted to connect or otherwise contact electrical receptacle terminals and/or wires connected to electrical receptacle terminals. For example, transmission tabs 306 may be configured to connect to neutral terminals such as neutral terminals 202 depicted in FIG. 2 and live terminals such as live terminals 204 also depicted in FIG. 2. Transmission tabs 306 may be flexible or otherwise angularly modifiable to connect with neutral terminals 202 and live terminals 204 at various heights and angles within an electrical receptacle box 210. In this way Transmission tabs 306 may be easily modified by an installer to configure with electrical receptacles having various configurations, or that are at various orientations in receptacle boxes due to installation differentiation.

It should be noted that although the transmission tabs 306 provide power to the electrical receptacle cover 300, that the speaker grille cover 318 and the electrical receptacle cover 300 may be insulated from the transmission tabs 306. This may prevent the transmission tabs 306 from providing electricity to components that may come into contact with a user or otherwise may cause an unintended shock.

The power from the neutral terminals 202 and the live terminals 204 may be routed to voltage reducing circuitry that may be embedded within or coupled to the electrical receptacle cover 300 in any suitable manner. The circuitry may be in communication via a connection wire (or other device) with the transmission tabs 306. In this manner, the circuitry may reduce the voltage from the transmission tabs 306 but also provide control, provide power to, and/or facilitate communication between the various components of the electrical receptacle cover 300. Electrical receptacle cover 300 and speaker grille cover 318, as well as corresponding circuitry may be in electrical contact via one or more magnetically inductive connections rather than or in addition to opposing male and female electrical plugs.

In addition to reducing the voltage, the circuitry may also be operable to convert AC voltage to DC voltage (i.e., provide a DC power supply). The DC power supply may be used to power various devices including, but not limited to, a light 312, speakers 310, a microphone, a camera, etc.

Electrical receptacle cover 300 may include internal speaker grille cover mounting apertures 308 for mounting the speaker grille cover 318 to the electrical receptacle cover 300 by inserting screws through external speaker grille cover mounting apertures 320 through internal speaker grille cover mounting apertures 308 while still providing access to outlets such as outlets 208 depicted in FIG. 2. This orientation provides security benefits in that electrical receptacle cover 300 is difficult to remove from an electrical receptacle box as removal requires the removal of screws or other attachment mechanisms that connect electrical receptacle cover 300 to speaker grille cover 318, as well as the subsequent removal of a screw which attaches electrical receptacle cover 300 to an electrical receptacle by way of insertion through cover plate mounting screw aperture 304 and cover plate mounting screw aperture 206 depicted in FIG. 2.

According to additional aspects electrical receptacle cover 300 may include internal magnetic component 314 and speaker grille cover 318 may include external magnetic component 324 such that when speaker grille cover 318 is placed over electrical receptacle cover 300 the two components are magnetically secured, aligning the two components such that the light aperture 322, the external speaker grille cover mounting apertures 320 and the external outlet apertures 326 are properly aligned with the light 312, the internal speaker grille cover mounting apertures 308 and the internal outlet apertures 315, respectively. Securing the speaker grille cover 318 to the electrical receptacle cover 300 with external magnetic component 324 and internal magnetic component 314 may also make it more difficult to remove the components, providing an additional level of security and making the components more difficult to steal.

Electrical receptacle cover 300 may include speakers 310 as well as a light 312 powered by way of transmission tabs 306. Speakers 310 may utilize Bluetooth integration and other radio frequency (RF) technologies incorporated within electrical receptacle cover 300. Electrical receptacle cover 300 may also include an internal magnetic component 314 for fixing itself to speaker grille cover 318, which may also employ a magnetic component such as external magnetic component 324 for fixing itself to electrical receptacle cover 300.

Although electrical receptacle cover 300 is shown with a pair of external outlet apertures 326 so as to fit a standard double-gang electrical receptacle box, in examples, electrical receptacle cover 300 may be configured with a single outlet aperture so as to fit a single-gang electrical receptacle box, or three or more single outlet apertures to fit a corresponding electrical receptacle box as needed.

According to yet other examples, an electrical receptacle cover may be configured to obtain power from a phone line rather than an electrical receptacle. For example, an electrical receptacle cover may be directly connected to a phone line in the case that the power goes out. That is, standard phone lines generally maintain approximately 50 volts of power even in the instance of a power outage due to phone companies maintaining their own backup power generators. As such, an electrical receptacle cover in accordance with this disclosure may be connected to a phone line rather than an electrical receptacle, and one or more charging devices, such as an inductive phone charger, may be associated with the phone line-connected electrical receptacle cover, which may provide a charging source for devices even in the event of a power outage. It should be understood that, in accordance with aspects of this disclosure, various components of the electrical receptacle cover 300 may be modified to accommodate a phone line power source rather than an electrical receptacle power source.

According to some examples, an electrical receptacle cover may be configured to obtain power from a light switch rather than an electrical receptacle. That is, in place of external outlet apertures 326, electrical receptacle cover 300 may have one or more light switch apertures and obtain power from a light switch receptacle.

Figure 4:
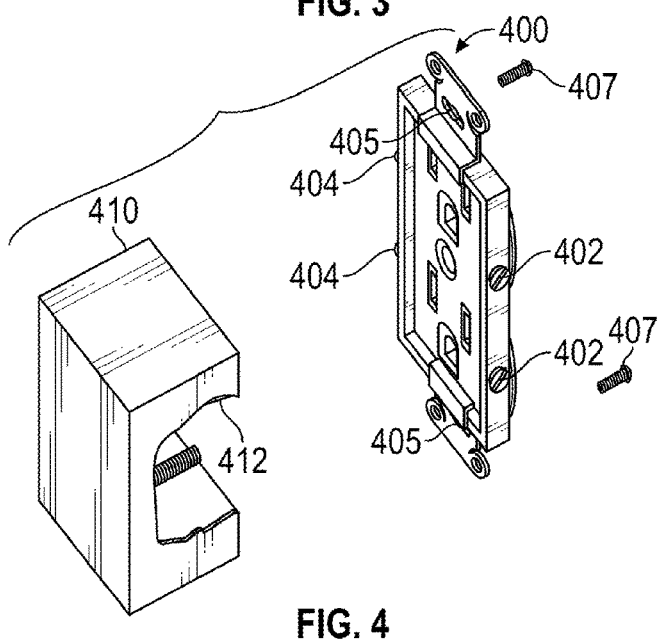
FIG. 4 is a rear perspective exploded view of an electrical receptacle and a receptacle box.

FIG. 4 depicts electrical receptacle 400 with neutral terminals 402, live terminals 404 and electrical receptacle mounting screws 407 for mounting electrical receptacle 400 to receptacle box 410 via receptacle box mounting apertures 412. Mounting screws 407 may be inserted through electrical receptacle mounting apertures 405 and receptacle box mounting apertures 412 and tightened to provide a snug fit between the electrical receptacle 400 and the receptacle box 410. Electrical receptacle 400 may connected to a power source by attaching or otherwise contacting the neutral terminals 402 to one or more neutral electrical wires (not shown) and the live terminals to one or more live electrical wires (not shown). A ground wire may also be connected to the electrical receptacle 400 as an added safety precaution.

Figure 5:
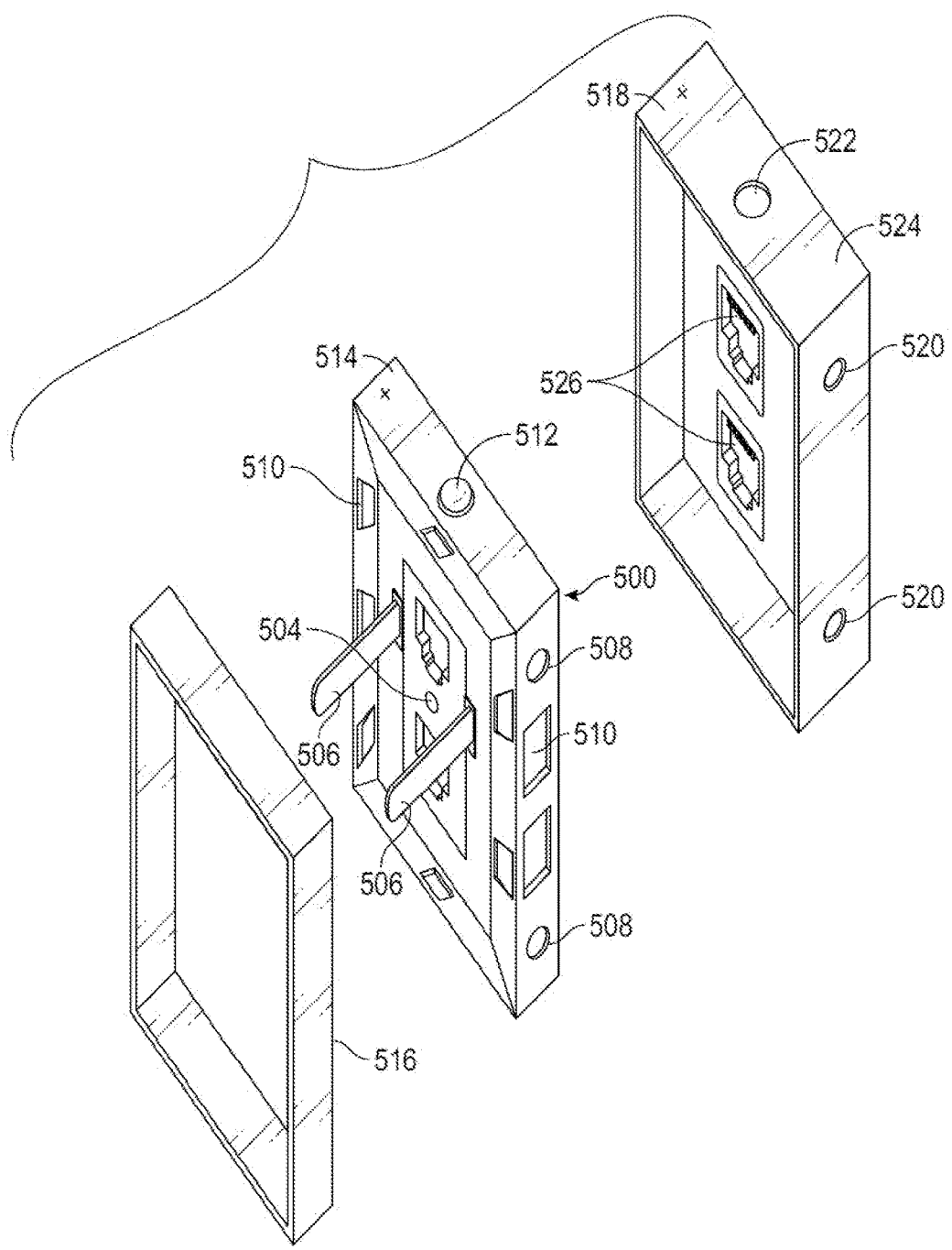
FIG. 5 is a rear perspective exploded view of an electrical receptacle cover.

FIG. 5 shows an exploded view of rear facing speaker grille cover 518, electrical receptacle cover 500 and receptacle box gasket 516. Electrical receptacle cover 500 may include cover plate mounting screw aperture 504 for mounting electrical receptacle cover 500 to an electrical receptacle such as electrical receptacle 200 depicted in FIG. 2 by means of cover plate mounting screw aperture 206, transmission tabs 506 for providing power to electrical receptacle cover 500 and its various components, internal speaker grille cover mounting apertures 508 for mounting speaker grille cover 518 to electrical receptacle cover 500, fluting 510 to provide improved sound quality and projection from speakers incorporated within electrical receptacle cover 500 and light 512 powered by means of connection between transmission tabs 506 and neutral and live terminals such as neutral terminals 202 and live terminals 204 depicted in FIG. 2.

According to aspects, the speaker grille cover 518 and/or the electrical receptacle cover 500 may include integrated circuitry for any of the various components of the electrical receptacle cover 500 discussed herein. Accordingly, the speaker grille cover 518 and/or the electrical receptacle cover 500 may house, accommodate, and otherwise be integrated with circuitry for speakers, charging devices, lights, magnets, microphones, cameras, computer hardware, wired and wireless communication means, etc.

According to examples any or all of these components may be powered directly by connection to the transmission tabs 506. Alternatively or additionally these components may be powered by one or more battery or capacitors (not shown) in the case that there is a power outage or short in the building containing the electrical receptacle cover 500. The one or more battery or capacitors may be rechargeable and connected to the transmission tabs 506 or directly to a structure's power source such that when power is returned to the electrical receptacle cover 500 via the transmission tabs 506 the battery or capacitors may be recharged. In addition, these charging components may allow the electrical receptacle cover 500 to report wirelessly to a predesignated device (e.g., smart phone, tablet, etc.) and provide updates regarding the removal of the electrical receptacle cover 500 from an electrical receptacle (e.g., theft), power outage and/or other environmental changes (e.g., temperature, movement, light, sound, etc.), via integrated circuitry and software.

According to additional aspects the speaker grille cover 518 and the electrical receptacle cover 500 may be used as a portable device when removed from an electrical receptacle and powered by one or more batteries. When removed from an electrical receptacle the speaker grille cover 518 and the electrical receptacle cover 500 may be secured by way of attachment mechanisms (e.g., screws) being placed through the external speaker grille cover mounting apertures 520 and the internal speaker grille cover mounting apertures 508. Alternatively or additionally, the speaker grille cover and the electrical receptacle cover 500 may be secured by way of the external magnetic component 524 and the internal magnetic component 514. Thus a user may make use of the various components of the electrical receptacle cover 500 and the speaker grille cover 518 at locations where mounting those components to an electrical receptacle is not feasible or practical.

As shown in FIG. 5, the electrical receptacle cover 500 includes only two transmission tabs 506 that may be coupled to the neutral terminals 202 and the live terminals 204 (shown in FIG. 2). However, it should be noted that in other examples, the electrical receptacle cover 500 may include a second set of tabs that may be coupled to one or more additional neutral terminals 202 and one or more additional live terminals 204. In these examples, a first set of transmission tabs 506 may provide power to a first set of one or more devices or elements integrated with the electrical receptacle cover 500 and a second set of transmission tabs (not shown) may provide power to a second set of one or more devices or elements different from the first set.

Figure 6:
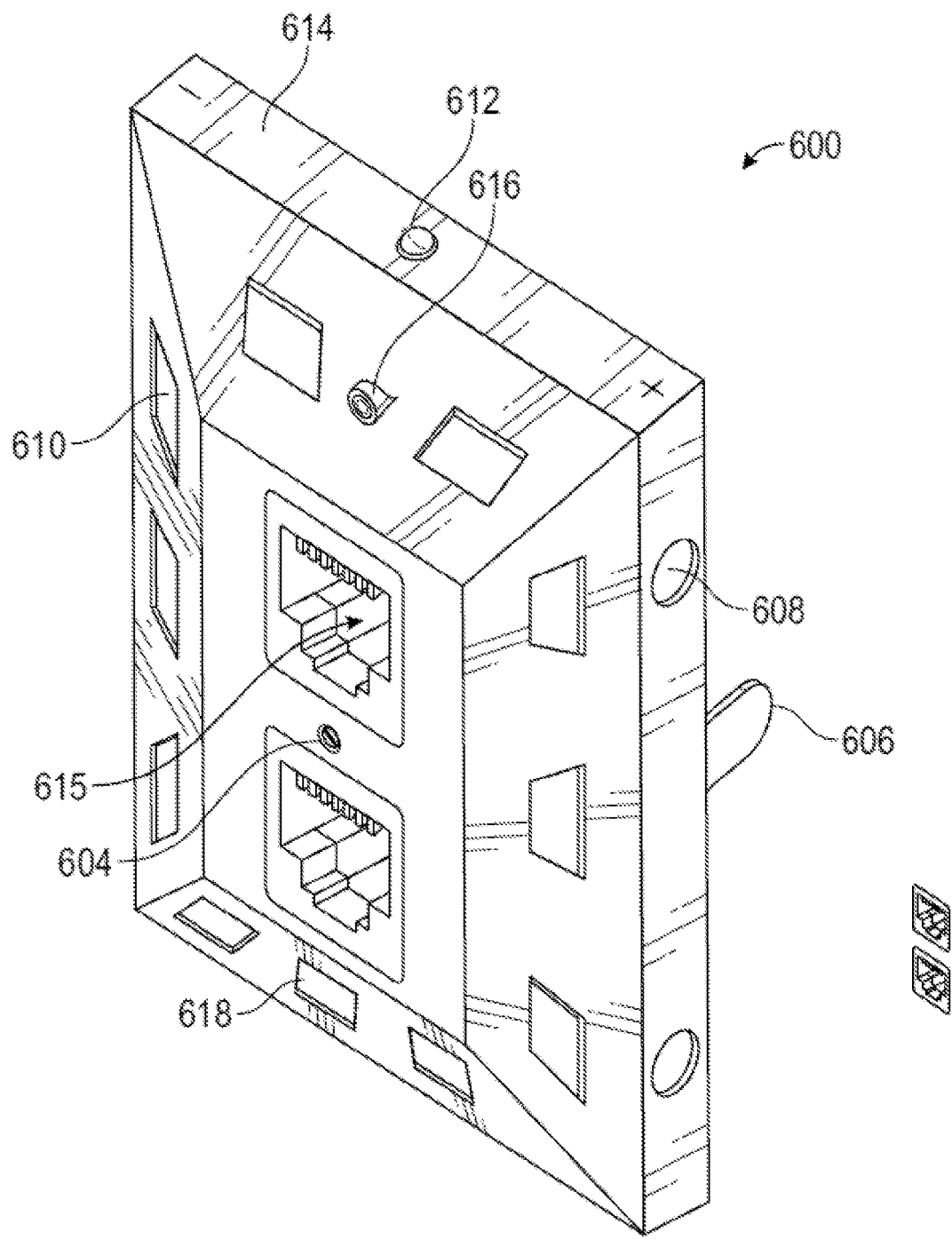
FIG. 6 is a front perspective view of an electrical receptacle cover.

FIG. 6 depicts forward facing electrical receptacle cover 600 which includes cover plate mounting screw aperture 604, transmission tabs 606, internal speaker grille cover mounting apertures 608, speakers 610, visual indicator 612, internal magnetic component 614, camera 616 and microphone 618. Transmission tabs 606 may provide power to, via connection to a power source through neutral and live terminals or wires connected thereto, components such as speakers 610, visual indicator 612, camera 616 and microphone 618. This embodiment of the electrical receptacle cover 600 may provide notifications and/or a safety light using the visual indicator 612. The visual indicator 612 may be a light emitting diode (LED), which may be desirable due to its long life and low power consumption. If the visual indicator 612 is a LED, integrated voltage reducing circuitry may only need to convert and reduce the voltage to about 2-12 volts DC. The visual indicator 612 may be other types of LEDs, such as a LED power chip, LED revolution light sheets, LED panel, or LEDs embedded in or between another panel.

Additionally, the visual indicator 612 may be substantially any shape or size. In some examples the visual indicator 612 may be a "light bar" or "light diffuser" (e.g., one or more LED lights may be positioned behind a transparent barrier). In other examples the electrical receptacle cover 600 may be formed substantially (or completely) of the visual indicator 612. For example, the electrical receptacle cover 600 may be formed of a self-illuminating plastic material, a plastic material that illuminates upon application of voltage, a LED plastic sheet, or translucent/electroluminescent material (e.g., electroluminescent panel), or may be coated with an illuminating material. Thus, any suitable visual light source configuration may be used, which may include single or multiple bulbs, diodes, or other sources.

According to additional aspects the electrical receptacle cover 600 may further include a sensor such as a photosensor or photodetector in communication with the visual indicator 612. As appreciated by those skilled in the art, photosensors or photodetectors are electronic components that are operable to detect the presence of visible light, ultraviolet energy, infrared energy, or the like. Thus, when the sensor is a photosensor or photodetector, the sensor may function to detect the level of light within a room and automatically switch the visual indicator 612 on/off accordingly. In this example, the visual indicator may be automatically turned on or off depending on the ambient light within the room. This may allow the visual indicator 612 to be activated at night to provide a "night light" or source of light in a dark room, and turned off when the room has a light turned on or during the day.

In other examples, the sensor may be a motion detector, which may allow the visual indicator 612 to be activated when there is movement near the electrical receptacle cover 600. This may allow the visual indicator 61 to be turned on if a user is walking near the electrical receptacle cover 600, which may provide illumination for a predetermined area near the electrical receptacle cover 600.

In some examples the electrical receptacle cover 600 may include an on/off switch that may be coupled to the sensor and/or the visual indicator 612. For example, in some instances, the on/off switch may activate the visual indicator 612 and may override the sensor. Similarly, this may allow the sensor to be deactivated so that the visual indicator 612 may not be turned on even if there is an event which would normally have the sensor trigger the visual indicator 612 (e.g., motion, decrease in ambient light).

The visual indicator 612 may be directly coupled to a power supply via transmission tabs 606 so that when activated, it remains on for a duration dictated by a notification mechanism even though an internal processor (not shown) and other components might shut down to conserve energy. The visual indicator 612 may be programmed to remain on indefinitely until a user takes action to indicate the power-on status of the device. This embodiment of the electrical receptacle cover 600 also includes a microphone 618 to receive audible input, such as to facilitate a telephone conversation or inter-home/office communication as traditionally accomplished by way of an intercom system. In accordance with embodiments of the present invention, the microphone may also serve as an audio sensor to facilitate control of notifications, as well as to communicate with a voice-controlled personal assistant. The voice-controlled personal assistant may be integrated as part of the electrical receptacle cover 600, or the speaker grille cover may be synced to one or more devices having a voice-controlled personal assistant, such as a smart phone, a tablet, a laptop, a personal computer, a smart TV and the like. The electrical receptacle cover 600 according to this embodiment further includes a video interface that enables an operation of an on-board camera 616 to record still images, video stream, and the like.

According to aspects the on-board camera 616 may be utilized as a home security system, as well as a baby or pet monitor. When utilized in this manner, the on-board camera 616 may stream video, as well as audio via the microphone 618 to a smart phone, a tablet, a personal computer, a smart TV and the like, as well as to secondary electrical receptacle covers in communication with electrical receptacle cover 600, directly via wired or wireless communication, or by way of the Internet and/or a local area network (LAN). Various applications may be utilized by any of these devices to control these functions.

According to examples, the on-board camera and microphone may be coupled to a photosensor, an audiosensor and/or a motion sensor such that video and audio is only streamed to other devices when the sensors are activated. Further, the other devices (e.g., a smart phone) may receive a notification via an application running on an operating system when one or more of the sensors have been activated, indicating that audio and/or video streaming is in progress. Additionally, a user may provide input using a device in communication with the electrical receptacle cover 600 to turn audio and video streaming on to one or more devices.

The electrical receptacle cover 600 may have additional features or functionality. For example, the electrical receptacle cover 600 may also include additional data storage devices (removable and/or non-removable) such as, magnetic disks, optical disks, or tape. Computer storage may include volatile and nonvolatile, removable and non-removable media implemented in any method or technology for storage of information, such as computer readable instructions, data structures, program modules, or other data.

Data/information generated or captured by the electrical receptacle cover 600 may be stored locally on the electrical receptacle cover 600, as described above, or the data may be stored on any number of storage media that may be accessed by the device via an on-board radio or via a wired connection between the electrical receptacle cover 600 and a separate computing device associated with the electrical receptacle cover 600, for example, a server in a distributed computing network, such as the Internet.

Aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 6 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the electrical receptacle cover 600 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The electrical receptacle cover 600 may also have one or more input device(s) such as a keyboard, a mouse, a pen, a sound or voice input device, a touch or swipe input device, etc. The output device(s) such as a display, speakers, etc. may also be included. The aforementioned devices are examples and others may be used. The electrical receptacle cover 600 may include one or more communication connections allowing communications with other computing devices. Examples of suitable communication connections include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory, the removable storage device, and the non-removable storage device are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the electrical receptacle cover 600. Any such computer storage media may be part of the electrical receptacle cover 600. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

The different aspects described herein may be employed using software, hardware, or a combination of software and hardware to implement and perform the systems and methods disclosed herein. Although specific devices have been recited throughout the disclosure as performing specific functions, one of skill in the art will appreciate that these devices are provided for illustrative purposes, and other devices may be employed to perform the functionality disclosed herein without departing from the scope of the disclosure.

Figure 7:
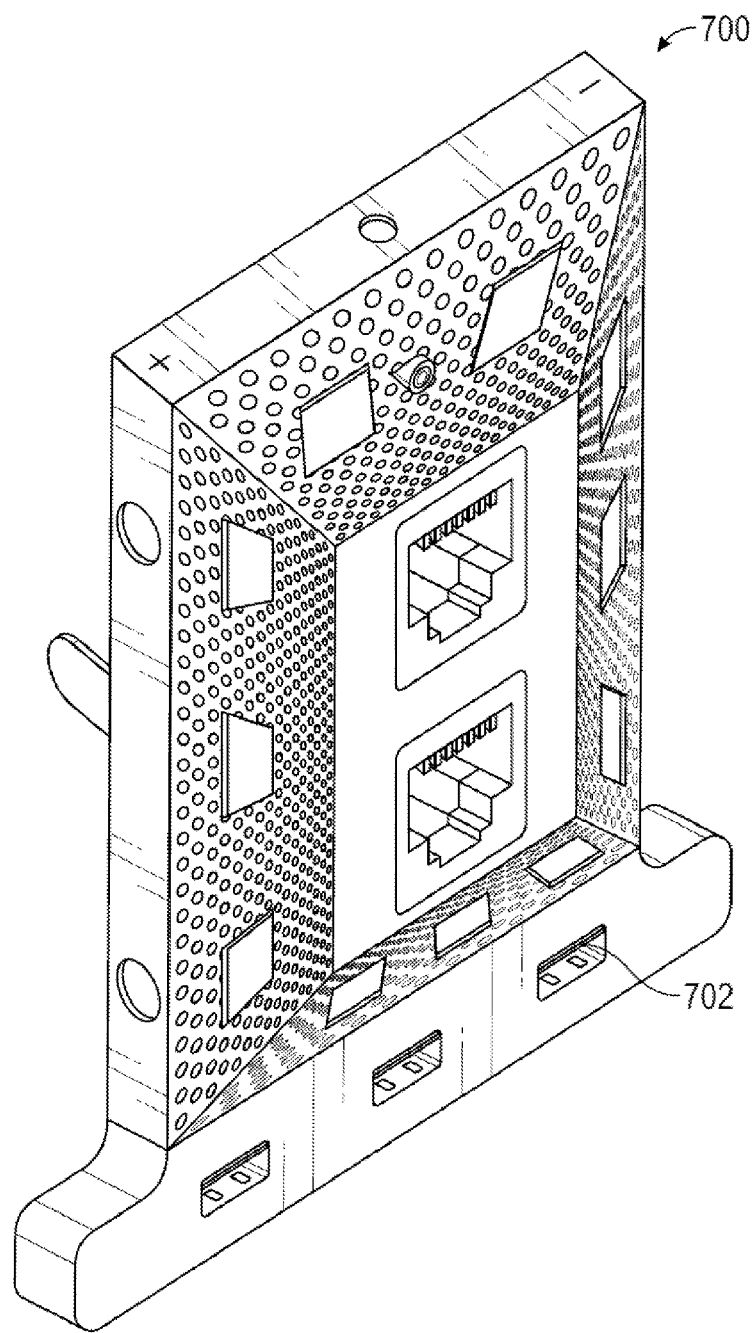
FIG. 7 is a front perspective view of an electrical receptacle cover.

Turning to FIG. 7 one aspect of an electrical receptacle cover 700 is provided. Electrical receptacle cover 700 includes additional power supply/communication ports 702 such as USB ports for providing power and communication to additional devices connectable through power supply/communication ports 702. It should be understood that the additional power supply/communication ports 702 may also include plug receivers or outlets, or other electrical cable connectors and receivers that may require a power source and may include substantially any type of plug/connector. Fr example, the ports may be configured to provide power to radio frequency cables or to radio frequency devices, such as through radio broadcasting data lines, radio frequency distribution, security system sensing modules for a radio frequency device, or a camera.

Figure 8:
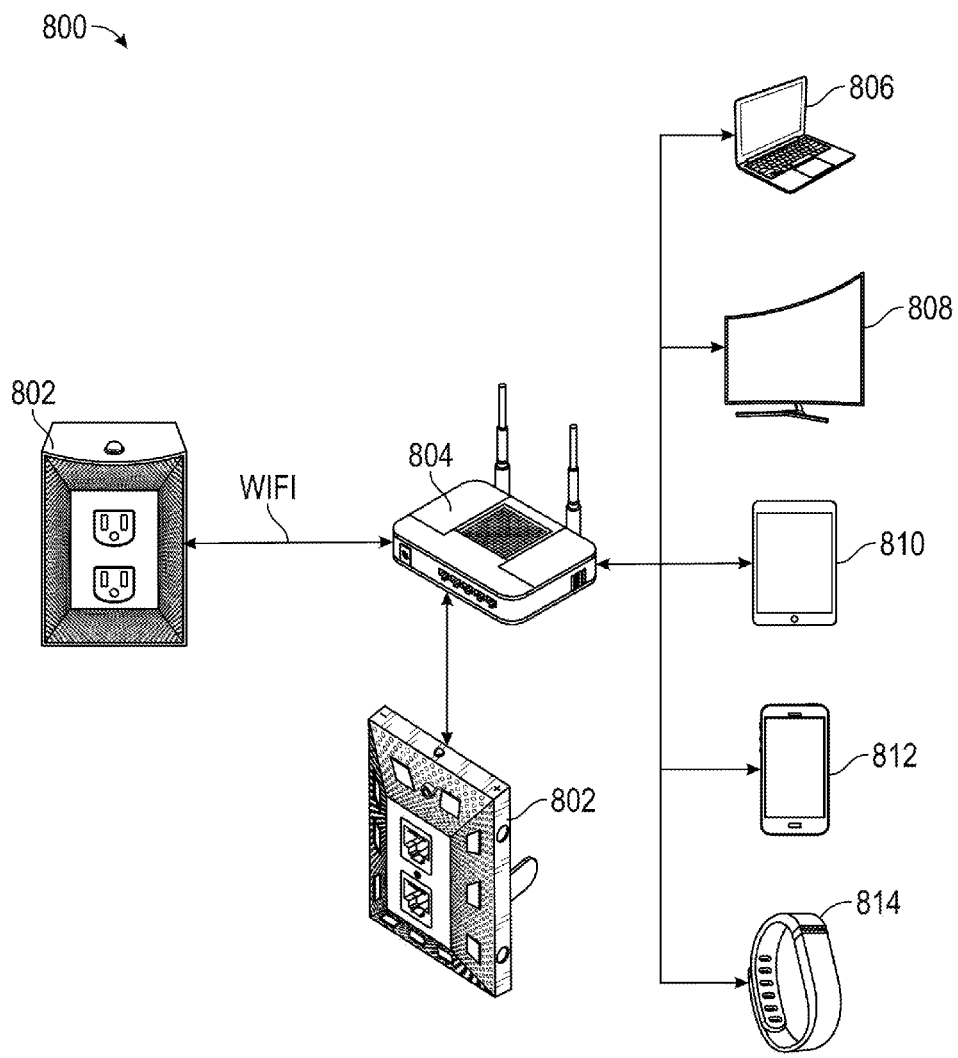
FIG. 8 is a simplified diagram of a distributed computing system in which aspects of the present invention may be practiced.

FIG. 8 is an example diagram of a distributed computing system in which aspects of the present invention may be practiced. According to examples any of computing devices 802 (electrical receptacle covers), 804 (modem/router), 806 (laptop), 808 (smart TV), tablet (810), 812 (cellular phone) and 814 (health monitoring device) may contain modules, components, engines, etc. for transmitting and receiving signals and communicating amongst one another as well as with external data providers (not shown). According to examples, the electrical receptacle covers 802 may communicate with other computing devices 806 (laptop), 808 (smart TV), 810 (tablet), 812 (cell phone) and 814 (health monitoring device) by transmitting or receiving a signal by a modem/router 804, which may forward one or more data packets and direct traffic amongst one or more devices within the distributed computing system 800, as well as the Internet. In certain aspects the distributed computer network may encompass a local area network (LAN) and may incorporate one or more routers, cable modems, or ADSL modems for Internet access, as well as one or more switches, firewalls, load balancers and sensors.

Figure 9:
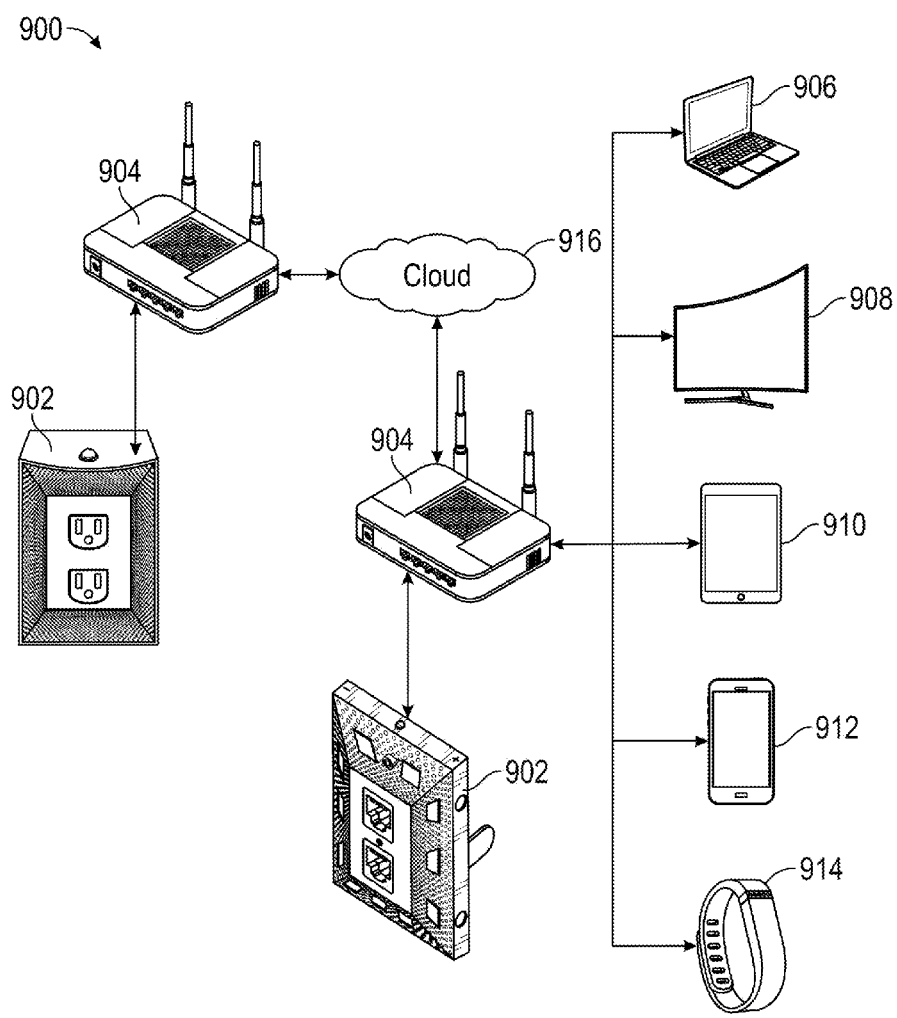
FIG. 9 is a simplified diagram of a distributed computing system in which aspects of the present invention may be practiced.

FIG. 9 shows an alternative distributed computing system 900. Distributed computing system 900 employs many of the same concepts and architecture as distributed computing system 800. Any of devices 902 (electrical receptacle covers), 904 (modem/router), 906 (laptop), 908 (smart TV), 910 (tablet), 912 (cell phone) and 914 (health monitoring device) comprising the distributed computing system 900 may communicate amongst one another as well as with the "outside world" via a cloud 916 which generally comprises one or more server devices in a distributed computing network, such as the Internet. As should be appreciated, data/information may be accessed via any of devices 902 (electrical receptacle covers), 904 (modem/routers), 906 (laptop), 908 (smart TV), 910 (tablet), 912 (cell phone) and 914 (health monitoring device) via a radio or via a distributed computing network. Similarly, such data/information may be readily transferred between computing devices for storage and use according to well-known data/information transfer and storage means, including electronic mail and collaborative data/information sharing systems.

Figure 10:
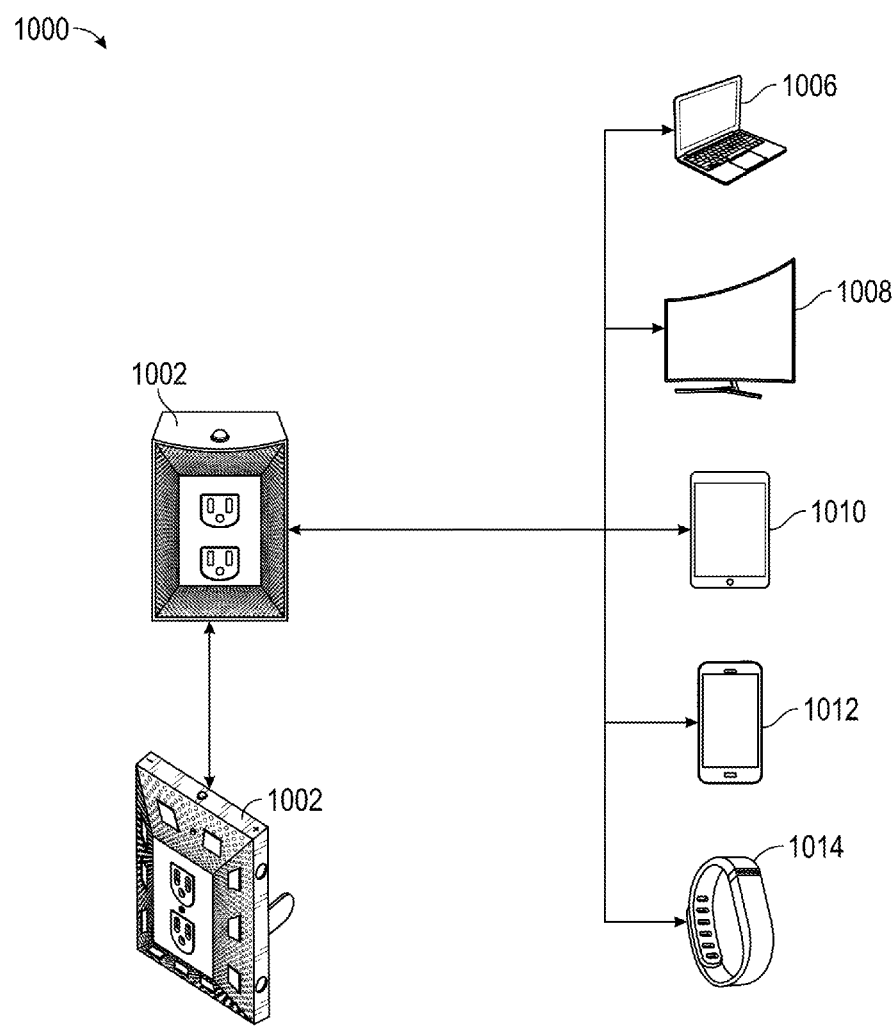
FIG. 10 is a simplified diagram of a distributed computing system in which aspects of the present invention may be practiced.

FIG. 10 shows an alternative distributed computing system 1000. Distributed computing system 1000 employs many of the same concepts and architecture as distributed computing systems 800 and 900. However, according to aspects of this embodiment electrical receptacle covers 1002 may directly communicate amongst one another, as well as with the other computing devices: 1006 (laptop), 1008 (smart TV), 1010 (tablet), 1012 (cell phone) and 1014 (health monitoring device) within the distributed computing system 1000, utilizing Bluetooth and similar technologies, rather than utilizing an intermediary communication device such as modem/router 804 and 904 shown in FIG. 8 and FIG. 9. It should be well understood that various combinations of the technologies and communications means shown and described in relation to FIG. 8, FIG. 9 and FIG. 10 may be combinable, and aspects of this disclosure are not limited to any one of the descriptions or architectures provided in relation to those figures.

Each of the devices shown in FIG. 8, FIG. 9 and FIG. 10 may use WiFi and Bluetooth technologies to communicate from one device to another, as well as to access the "outside world" such as the Internet, and in certain aspects may also employ Ethernet technologies. For example, each of the computing devices shown in FIG. 8, FIG. 9 and FIG. 10 may include one or more radio that perform the functions of transmitting and receiving radio frequency communications. The radio facilitates wireless connectivity for each computing device in the distributed computing systems 800, 900 and 1000 and the "outside world," via a communications carrier or service provider. Transmission to and from the radio may be conducted under control of an operating system installed on each device. In other words, communications received by the radio may be disseminated to applications and programs via the operating system, and vice versa. The radio allows each device in the distributed computing systems 800, 900 and 1000 to communicate with other computing devices such as over a network. The radio is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, not limitation, communication media includes wired media such as a wired network or direct-wired connection, and wireless media such as acoustic, RF infrared and other wireless media. The term computer readable media as used herein includes both storage media and communication media.

The various examples described above are provided by way of illustration only and should not be construed to limit the claims attached hereto. Those skilled in the art will readily recognize various modifications and changes that may be made without following the various aspects, examples and applications illustrated and described herein, and without departing from the true spirit and scope of the following claims. Further, one of skill in the art will appreciate that the scale of systems such as distributed computing systems 800, 900 and 1000 may vary and may include more or fewer components than those described in FIG. 8, FIG. 9 and FIG. 10. In some examples, interfacing components of the distributed computing systems 800, 900 and 1000 may be spread across one or more devices of those systems. In examples, one or more data stores/storages or other memory are associated with distributed computing systems 800, 900 and 1000. For example, a component of those systems may have one or more data storages/memories/stores associated therewith. Data associated with a component of distributed computing systems 800, 900 and 1000 may be stored thereon as well as processing operations/instructions executed by a component of those systems.

Turning to FIG. 11 a first diagram 1100 of a first electrical receptacle cover 1104 integrated with a first inductive charger 1112 for charging a first mobile computing device 1108, and a second diagram 1102 of a second electrical receptacle cover 1106 integrated with a second inductive charger 1114 for charging a second mobile computing device 1110 is provided. First inductive charger 1112 and second inductive charger 1114 may be configured to integrate with first electrical receptacle cover 1104 and second electrical receptacle cover 1106 as add-on options, may include one or more varieties of cover styles and may be attachable to one or more electrical receptacles via a magnetic component. First inductive charger 1112 and second inductive charger 1114 may also comprise standalone units separate from, but in communicative contact with, first electrical receptacle cover 1104 and second electrical receptacle cover 1106.

At FIG. 12 three diagrams 1200, 1202 and 1204 are shown with electrical receptacle covers 1206, 1208 and 1210, having movable RF extenders 1214, 1216 and 1218 at various angles. Movable RF extenders 1214, 1216 and 1218 may comprise a pair of extenders as shown in each of diagrams 1200, 1202 and 1204. According to other aspects movable RF extenders 1214, 1216 and 1218 may comprise a single RF extender or multiple sets of RF extenders. Movable RF extenders 1214, 1216 and 1218 may be configured to provide longer RF reception and transmission of RF signals such as Bluetooth signals and WiFi signals.

Turning to FIG. 13 a basic top view of a building 1300 in which RF extenders 1310A, 1310B, 1310C and 1310 D operatively connected with one or more electrical receptacle covers in building 1300 are shown, along with outlets 1312A, 1312B, 1312C and 1312D which have not been integrated with RF extenders operatively connected with one or more electrical receptacle covers. Garage 1302 may be integrated with RF extenders 1310 which may be in communicative contact with devices and/or electrical components in connection with RF extenders in other rooms of building 1300 such as office 1306 with RF extenders 1310C, living room 1304 with RF extenders 1310B and bedroom 1308 with RF extenders 1310D.

Figure 14:
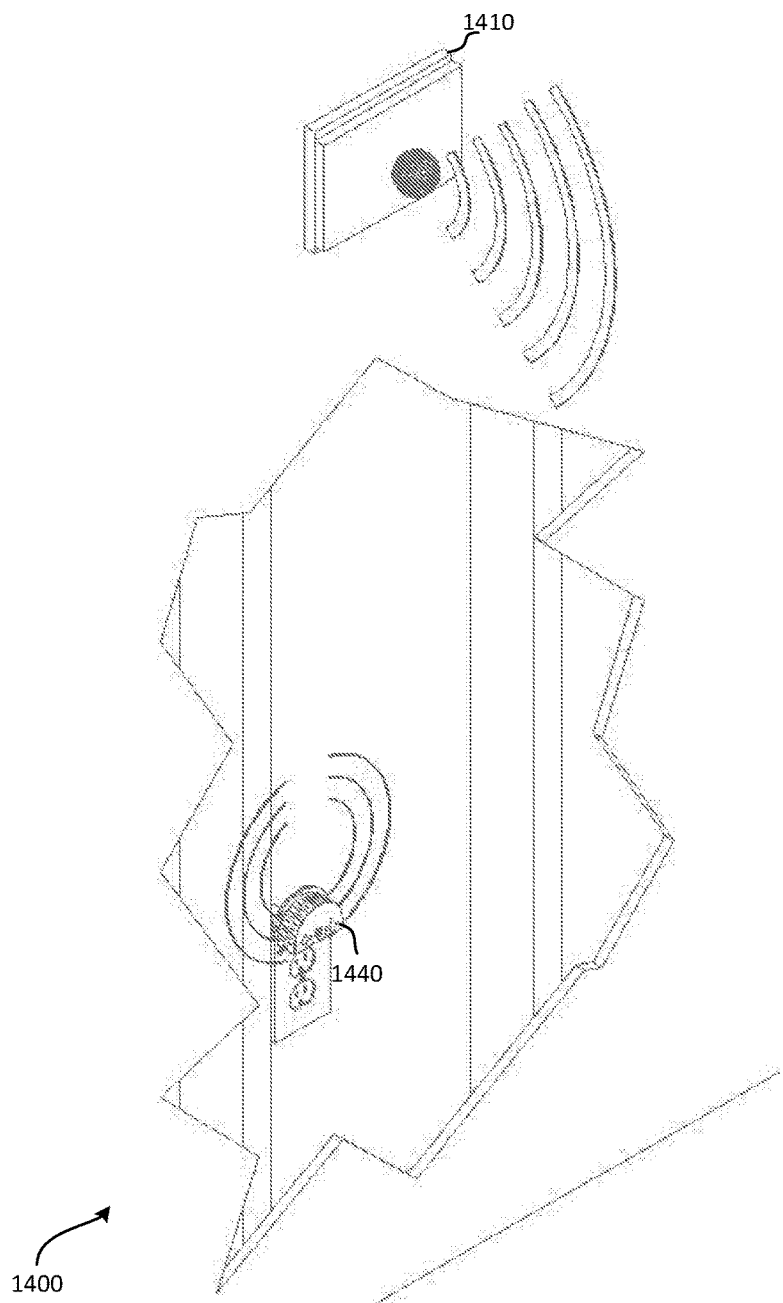
FIG. 14 illustrates an exemplary loudspeaker system.

FIG. 14 illustrates an exemplary loudspeaker system 1400. The loudspeaker system 1400 may include a mode throttling device 1410, and an exciter device 1440, which may be included as a component of an outlet receptacle cover as described herein. The exciter device 1440 may be in direct or indirect communication with the mode throttling device 1410. The loudspeaker system 1400 may be located on a vibrating surface, such as a compliant surface that may support shear and bending forces that may deform and radiate energy, such as acoustic energy, in response to an energy source in direct or indirect communication with the vibrating surface. The vibrating surface may include a panel surface that may act as a diaphragm, such as to transmit acoustic energy to the surrounding environment. In an example, a panel surface may include a finished exterior or interior surface of a building, such as plasterboard sheeting connected to a stud frame. For example, the panel surface diaphragm may include a portion of plasterboard between two studs in a stud frame, such as a stud wall frame or joists in a ceiling frame, an entire wall surface, such as defined by a plasterboard connected to multiple studs in a stud wall frame, an entire ceiling surface, such as defined by plasterboard connected to multiple ceiling joists, or a floor surface, such as decking connected to multiple floor joists.

A finished interior wall surface, such as plasterboard sheeting between two studs of a stud wall frame, may act as a diaphragm to transmit acoustic energy to an environment. The mode throttling device 1410 may be attached to the wall surface, such as with an adhesive, to adjust a structural mode of the wall surface. Additional mass, such as additional modal mass provided by the mode throttling device 1410, may increase the inertia of a structural mode which may increase the displacement of the structural mode during excitation as compared to a static condition, such as to increase the acoustic energy transmitted to the environment by the structural mode. An exciter device 1440 may be in communication with the wall surface, such as to transmit energy to the wall surface causing the wall surface to vibrate and amplify acoustic energy transmitted to the environment at the frequency of the adjusted structural mode. The mode throttling device 1410 may be removed and reattached to the wall surface, such as to amplify or attenuate the transmitted acoustic energy or adjust the frequency of the structural mode.

The loudspeaker system 1400 may be used to improve the acoustic environment of a building. In an example, the loudspeaker system 1400 may enhance the frequency response, such as the low frequency response, of an entertainment system, such as audio from a DVD or streaming video program, by providing a relatively large diaphragm surface to generate acoustic signals.

The loudspeaker system 1400 may be used to alert occupants of a building to different conditions. In an example, the mode throttling device 1410 may be used to "tune" or otherwise adjust a structural mode of a vibrating surface, such as a wall surface, from a first frequency to a specified frequency to amplify the specified frequency. For example, the loudspeaker system 1400 may receive signals at the exciter device 1440, such as indications of a ringing doorbell, a ringing telephone, a weather alert, etc., and transform the signals, such as to a lower frequency that correlates with a structural mode at a specified frequency of the vibrating surface, to a specified frequency that may be more easily perceived by those with physical impairments as to conditions in the environment.

Figure 15:
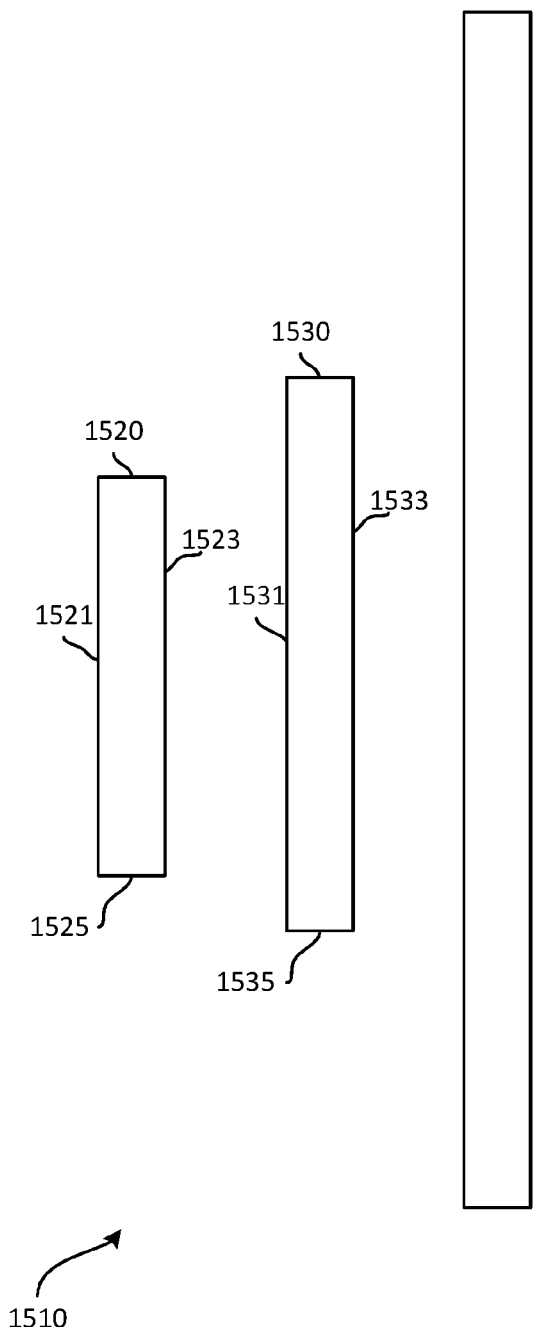
FIG. 15 is an exploded view of an exemplary mode throttling device according to aspects described herein.

FIG. 15 is an exploded view of an exemplary mode throttling device 1510 according to aspects described herein. The mode throttling device 1510 may include an adjustable mass component 1520, and an adjustable stiffness component 1530 connected to the adjustable mass component 1520.

The adjustable mass component 1520, may include a first area with a first surface 1521, a second area with a second surface 1523 facing in a direction generally opposite of the first surface 1521, and an edge surface 1525, the edge surface 1525 connecting the periphery of the first surface 1521 with the periphery of the second surface 1523, such as to define a volumetric shape. The volumetric shape may assume any three-dimensional shape without affecting performance of a loudspeaker system, such as loudspeaker system 1400, including symmetrical shapes, such as: a cube, a cone, a hemisphere, and a torus; and non-symmetrical shapes, such" an amorphous volume (or a "blob").

The adjustable mass component 1520 may include regular shapes, such as shapes that may be visually unobtrusive to an observer. In an example, the second surface 1523 may be generally parallel to and facing in an opposite direction from the first surface 1521, with a generally uniform thickness, such as the distance between the first and second surfaces 1521 and 1523, and may be approximately the same as measured perpendicularly between specified locations on the first and second surfaces 1521, 1523.

The volumetric shape of the adjustable mass component 1520, may be characterized by a shape parameter, such as a parameter defining a ratio of physical dimensions of the volumetric shape. As used herein, a shape parameter may include an area-thickness ratio parameter, such as the ratio of the area of the first surface 1521 to the thickness of the adjustable mass component 1520, such as the distance between the first and second surfaces, 1521 and 1523, respectively. For a given area of the first surface 1521, as the thickness of the sheet decreases, the area-thickness ratio increases. In an example, the adjustable mass component 1520 may take the form of a broad, flat piece of material, such as sheet, with an area of the first surface 1521 being greater than the thickness of the adjustable mass component 1520.

The adjustable mass component 1520 may assume an area-thickness ratio, such as a range of area-thickness ratio. The area-thickness aspect ratio may include a range of about 1 to about 1,000,000, such as a range from about 1 to about 100,000, a range from about 1 to about 10,000, a range from about 1 to about 1,000, and a range from about 1 to about 100. In an example, the adjustable mass component 1520, may assume the shape of a sheet, such as a sheet with an area-thickness ratio in a range from 10 to 1,000.

The adjustable mass component 1520, may be constructed from one or more materials that provide an adjustable mass component that exhibits one or more specified physical properties. For example, the adjustable mass component may exhibit one or more specified physical properties, based on the one or more materials that comprise the adjustable mass component 1520, such as mass density property. In an example, the mass density property for the adjustable mass component 1520 may include a range of about 2 g/cc (i.e., g/cc=grams per cubic centimeter) to about 15 g/cc. For example, the adjustable mass component 1520 may be constructed from mass-loading materials such as at least one of aluminum (2.7 g/cc), zinc (7.0 g/cc), iron (7.1 g/cc), tin (7.4 g/cc), common steel (7.8 g/cc), brass (8.5 g/cc), nickel (8.6 g/cc), copper (8.9 g/cc), lead (11.3 g/cc), and alloys of the aforementioned materials. A specified physical property may include formability of the material. Formability may include an indication of malleability, such as the property of a material to deform under compression, and an indication of ductility, such as the property of a material to stretch under load. In an example, the adjustable mass component 1520 may be constructed from mass-loading materials with at least one of malleability and ductility greater than common steel.

The adjustable mass component 1520 may be formed, such as by a user of the adjustable mass component 1520, to meet specified weight requirements. In an example, a user may acquire a mass-loading material with a specified form and density, such as a sheet of material 4 mm in thickness with density in a range of about 2 g/cc to about 15 g/cc, and trim the mass-loading material, such as with scissors or shears, to form an adjustable mass component 1520, such as an adjustable mass component 1520 with a specified area-thickness ratio.

The adjustable stiffness component 1530, may include a third area with a third surface 1531, a fourth area with a fourth surface 1533 facing in a direction generally opposite of the third surface 1531, and a stiffness edge surface 1535, the stiffness edge surface 1535 connecting the periphery of the third surface 1531 with the periphery of the fourth surface 1533, such as to define a volumetric shape. In an example, the fourth surface 1533 may be generally parallel to and facing in an opposite direction from the third surface 1531 with a generally uniform thickness, such as the distance between the third and fourth surface 1531, 1533 is approximately the same as measured perpendicularly between specified locations on the third and fourth surfaces 1531, 1533.

The adjustable stiffness component 1530, may assume a volumetric shape, such as a volumetric shape selected for a specific application requirement. In an example, the adjustable stiffness component may include an area-thickness ratio parameter, such as the ratio of the third surface 1531 to the thickness of the stiffness edge surface 1535.

The adjustable stiffness component 1530, may assume an area-thickness aspect ratio, such as a range of area-thickness aspect ratios. The area-thickness aspect ratio may include a range of about 1 to about 1,000,000, such as a range from about 1 to about 100,000, a range from about 1 to about 10,000, a range from about 1 to about 1,000, and a range from about 1 to about 100. In an example, the adjustable stiffness component 1530, may assume the shape of a sheet, such as a sheet with an area-thickness ratio in a range from about 100 to about 10,000.

The adjustable stiffness component 1530, may be constructed from materials, such as stiffness-loading material, with a specified stiffness. In an example, the specified stiffness may include a range of about 10 N/m to about 10,000 N/m. For example, the adjustable stiffness component 1530 may be constructed from an adhesive material, such as physically hardening materials including plastisols, water-based adhesives, organic solvent adhesives, and glues, such as craft glues, rubber cement, and hot glues; chemically curing materials, such as anaerobics, cyanoacrylates, heat/moisture/radiation cure materials, silicones, epoxies, methyl methacrylates, silicone adhesives, urethanes; and pressure sensitive adhesives (or PSA) including spray adhesives including pressure sensitive tapes and fabrics.

According to examples, an exciter device, such as exciter device 1440, may include a source of energy capable of transmitting the energy to a vibrating surface. The exciter device may include at least one of a servohydraulic, servopneumatic, or electric generator, such as inductive, capacitive, and piezoelectric generators. In an example, the exciter device 1440 may include a "thumper", such as a seismic mass attached to a linear electric motor, directly coupled to the vibrating surface. In an example, the exciter device 1440 may include a speaker, such as a loudspeaker, indirectly coupled to the vibrating surface, such as by transferring energy from the speaker via acoustic waves impinging on the vibrating surface and causing the vibrating surface to move. In an example, the exciter device 1440 may comprise an electrical receptacle cover comprising: a first transmission tab configured to be electrically connected to a neutral terminal of the electrical receptacle; a second transmission tab configured to be electrically connected to a live terminal of the electrical receptacle; a speaker device in electrical communication with the first and second transmission tabs; and a speaker grille cover secured to the receptacle cover.

The exciter device 1440 may generate energy at one or more frequencies, such as a range of frequencies. The generated frequencies may include a range of about 0.1 Hz to about 25 kHz, such as a range from about 0.1 Hz to about 20 kHz, from about 0.1 Hz to about 15 kHz, from about 0.1 Hz to about 10 kHz, from about 0.1 Hz to about 5 kHz, from about 0.1 Hz to about 2 kHz, and from about 0.1 Hz to about 500 kHz. In an example, the exciter device 1440 may generate specified frequencies, such as frequencies in the audible range of human hearing (i.e., about 20 Hz to about 20 kHz).

A mode throttling device, such as mode throttling device 1410 may be formed by attaching the adjustable stiffness component 1530 to the adjustable mass component 1520. Attaching the adjustable stiffness component 1530 may include applying the adjustable stiffness component 1530 to the adjustable mass component. In an example, applying may include spreading an adhesive, such as from an applicator device, or spraying an adhesive, such as from a pressurized spray may, onto the second surface of the adjustable mass component 1520. In an example, applying may include adhering a sheet of the adjustable stiffness component 1530, such as a pressure sensitive tape, onto the second surface of the adjustable mass component 1520.

The function of the mode throttling device 1510 may be influenced by the amount of surface area contact between the adjustable mass component 1520 and the adjustable stiffness component 1530. The third side 1531 of the adjustable stiffness component 1530 may be in contact with a specified percentage of to the second side 1523 of the adjustable mass component 1520, such as the third side 1531 may contact about 5%, 10%, 15%, 20%, 25%, 30%, 35%, 40%, 45%, 50%, 55%, 60%, 65%, 70%, 75%, 80%, 85%, 90%, or 95% of the second side 1523. In an example, the third side 1531 may be in complete contact with the second side 1523 when the third side 1531 contacts about 100% of the second side 1523.

The mode throttling device 1510 may function as a tuning mass, such as a mass that may be attached to a vibrating surface to adjust the natural frequency of the vibrating surface. The mode throttling device 1510 may amplify or attenuate a structural mode when applied as a tuning mass. In an example, the mode throttling device 1510 may act as a tuning mass when about 100% of the second side 1523 contacts the third side 1531.

Figure 16:
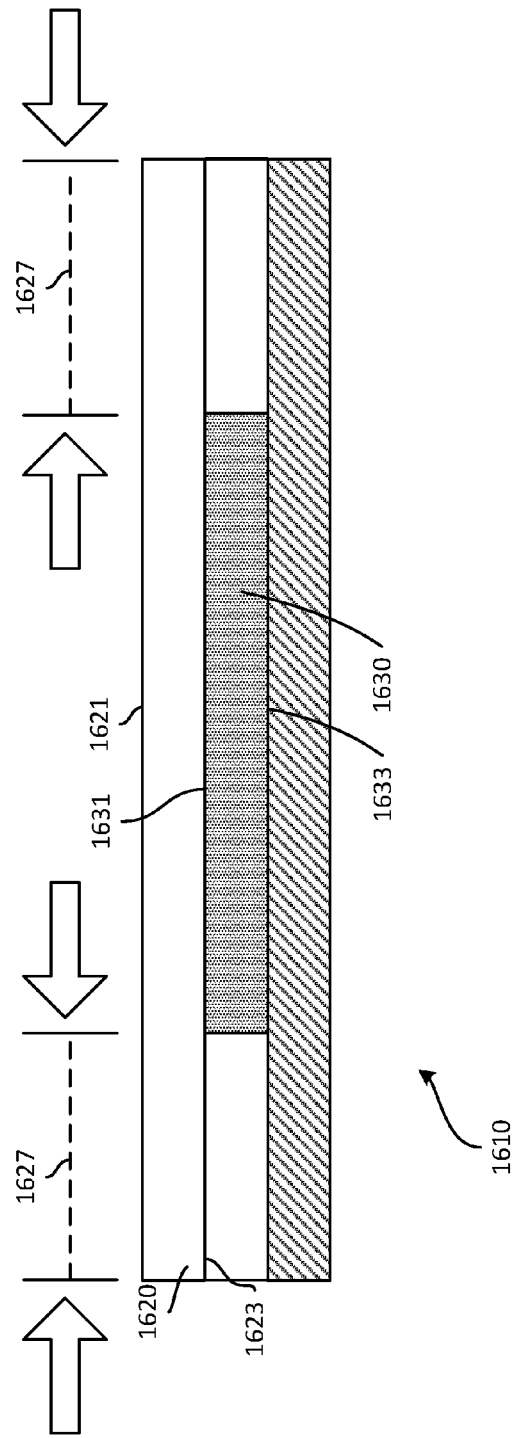
FIG. 16 is a side view of an exemplary mode throttling device as a beam acoustic source.

FIG. 16 is a side view of an exemplary mode throttling 1610 device as a beam acoustic source. The amount of surface area contact between the adjustable mass component 1620 and the adjustable stiffness component 1630 may result in a free surface 1627 that may move in response to excitation of the adjustable stiffness component 1630 by the vibrating surface. The moving free surface area 1627 may transmit acoustic energy from the vibrating surface to the environment, such as when a structural mode of the free surface area 1627 may be energized by an exciter source, such as exciter source 1440 described in relation to FIG. 14. As the contact area between the second side 1623 and the third side 1631 increases, higher frequencies may be achieved.

Figure 17:
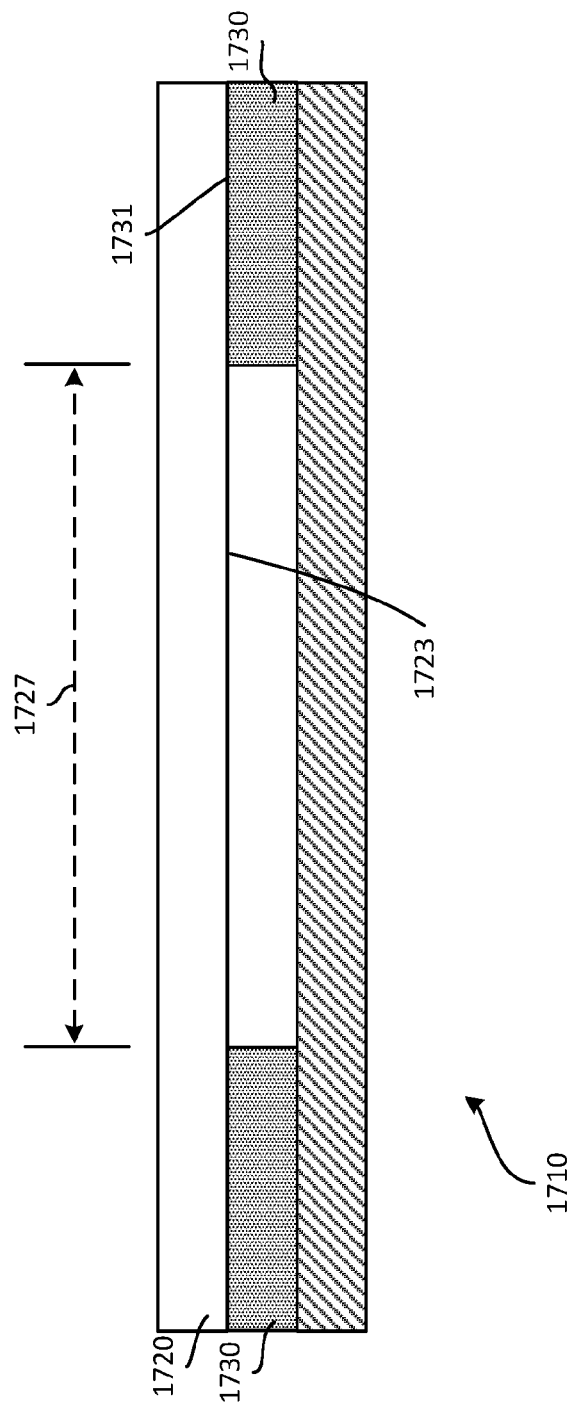
FIG. 17 is a side view of an exemplary mode throttling device as a diaphragm acoustic source.

FIG. 17 is a side view of an exemplary mode throttling device 1710 as a diaphragm acoustic source. The amount of surface area contact between the adjustable mass component 1720 and the adjustable stiffness component 1730 may result in a free surface 1727 that may move in response to excitation of the adjustable stiffness component 1730 by the vibrating surface. As the contact area between the second side 1723 and the third side 1731 increases, higher frequencies may be achieved.

According to examples, a loudspeaker system (e.g., loudspeaker system 1400) may be energized, such as by an exciter device, such as exciter device 1440 depicted in FIG. 14, in communication with the mode throttling device 1710. In transferring energy from the exciter device 1440 to the vibrating surface, the mode throttling device 1710 may move with the vibrating surface and affect the vibrating surface, such as the mode throttling device 1710 may increase the modal mass of a structural mode. In an example, the mode throttling device 1710 may adjust the frequency of the structural mode, such as to decrease the frequency of the structural mode.

The exciter device 1440 may be directly coupled to the vibrating surface, such as in direct contact with the vibrating surface. Directly coupling the exciter device 1440 to the vibrating surface may enhance energy transmission efficiency by minimizing energy loss through dissipative mechanisms, such as friction.

Figure 18:
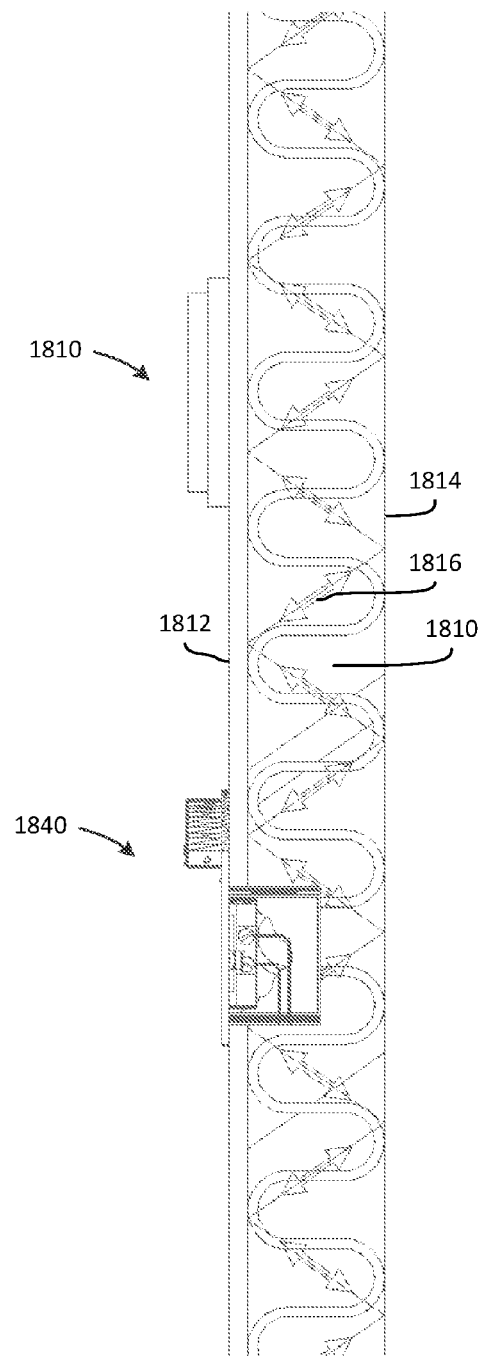
FIG. 18 is a cross section of an exemplary exciter device indirectly coupled with a vibrating surface.

FIG. 18 is a cross section of an exemplary exciter device 1840 indirectly coupled with a vibrating surface. In an example, a wall cavity 1810 may be formed in a stud wall, such as a wall cavity 1810 defined by an anterior surface 1812, such as a vibrating surface, a posterior surface 1814, such as surface opposite and generally parallel to the anterior surface 1812, and side surfaces, such as studs in a stud wall. An exciter device, such as exciter device 1840, may transmit energy into the wall cavity 1810, such as acoustic energy with an electric generator, to excite a standing wave 1816 at a frequency corresponding to a natural frequency of the wall cavity. Energy, such as reflected energy from the standing wave 1816, may be transferred to the anterior surface 1812 and excite the vibrating surface, such as the vibrating surface to which the mode throttling device 1810 has been attached. In an example, the mode throttling device 1810 may be selected to adjust the structural mode of the anterior surface 1812 to match with the standing wave 1816 of the cavity 1810 to maximize energy transfer at a specified frequency or range of frequencies, such as to maximize transfer of acoustic energy to the environment.

Figure 19:
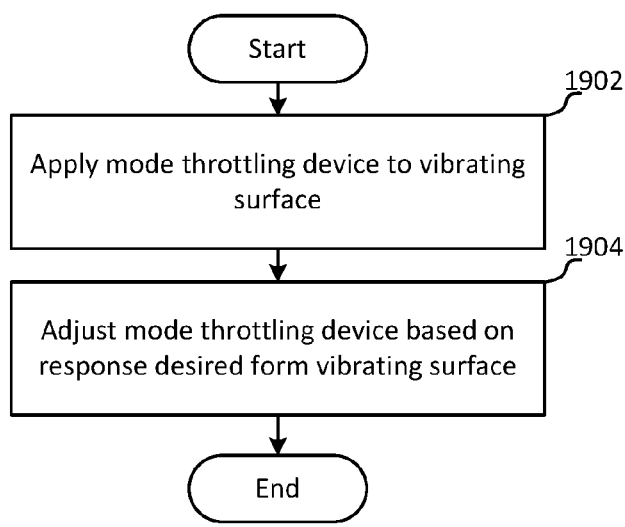
FIG. 19 is a flow chart illustrating an exemplary method for adjusting a mode throttling device.

FIG. 19 is a flow chart illustrating an exemplary method 1900 for adjusting a mode throttling device. The method 1900 begins at a start operation and continues to operation 1902, where a mode throttling device, such as a mode throttling device 1410 with an area-thickness ratio between 100 and 10,000 may be applied to a vibrating surface. The mode throttling device may be applied to a vibrating surface with an adhesive, such as at least one of a physically hardening material, a chemically curing material, and a pressure sensitive adhesive. The adhesive may be applied to a surface of the mode throttling device that faces the vibrating surface, such as the fourth surface 1533 of the mode throttling device 1510 depicted in FIG. 15.

Moving from operation 1902, flow continues to operation 1904, where the mode throttling device may be modified to achieve a specified acoustic response from the vibrating surface. A specified acoustic response may include amplifying a structural mode of the vibrating surface by changing inertia of a structural mode, such as by increasing the modal mass associated with the structural mode. A specified acoustic response may include attenuating a specified structural mode of the vibrating surface, such as by locating the mode throttling device to adjust the structural mode from a first frequency to a second frequency, the second frequency different from the first frequency.

Modifying the mode throttling device at operation 1904 may include changing the adjustable mass component. For example, the mode throttling device may be modified by reducing its mass. Reducing the mode throttling device's mass may include trimming the adjustable mass component, such as with scissors or shears, to reduce the modal mass associated with a structural mode. Reducing the mass may include forming the adjustable mass component with a perforation or parting line, such as an area of local weakness in the adjustable mass component, that may allow a user to modify the adjustable mass component without the use of hand tools, such as scissors or shears.

Modifying the mode throttling device at operation 1904 may additionally or alternatively include adding mass to the mode throttling device, such as one or more adjustable mass component (e.g., adjustable mass component 1520 depicted in FIG. 15) to a vibrating surface, such as to increase the modal mass associated with a structural mode. Modifying the mode throttling device may include attaching one or more mode throttling devices together. In an example, the multiple mode throttling device may be stacked, or otherwise joined together, such as a fourth side 1533 of an adjustable stiffness component 1530 (depicted in FIG. 15) being attached to a first side 1521 of an adjustable mass component, thereby adjusting the modal mass associated with a structural mode.

Figure 20:
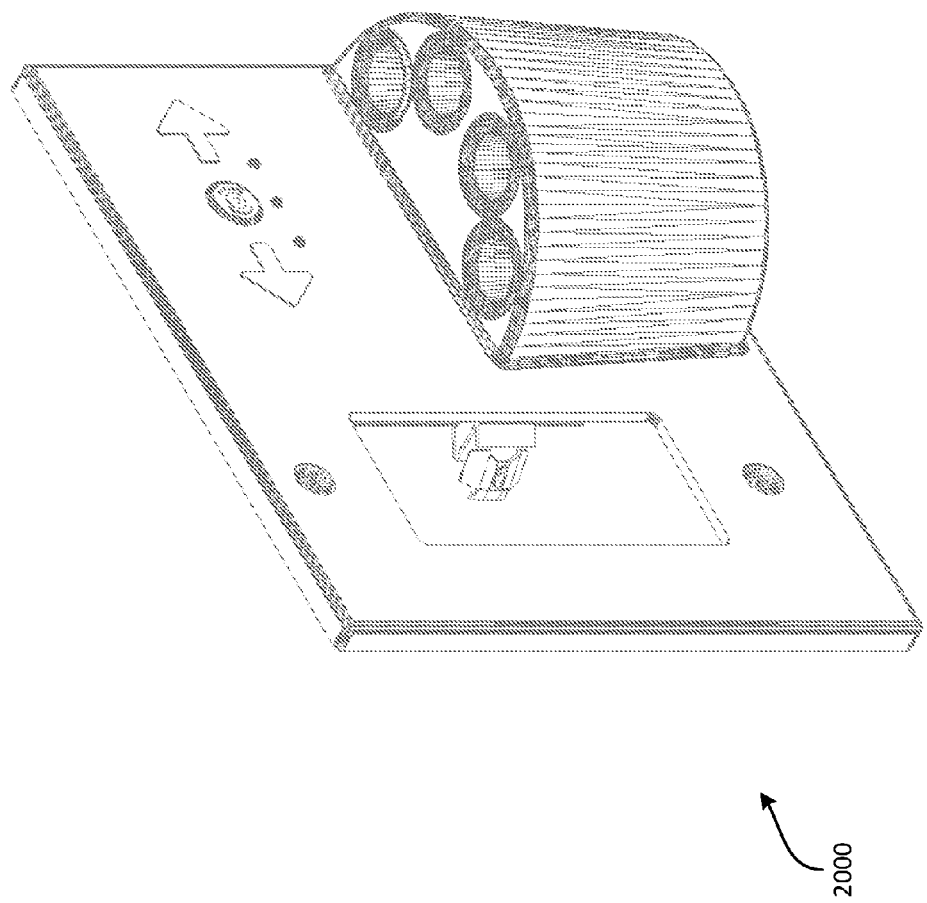
FIG. 20 is a diagram depicting a front view of an inductive charger for appliances and personal electronics configured to be adjoined to an electrical receptacle.

FIG. 20 is a diagram depicting a front view of an inductive charger 2000 for appliances and personal electronics configured to be adjoined to an electrical receptacle configured with a mode throttling device.

Figure 21:
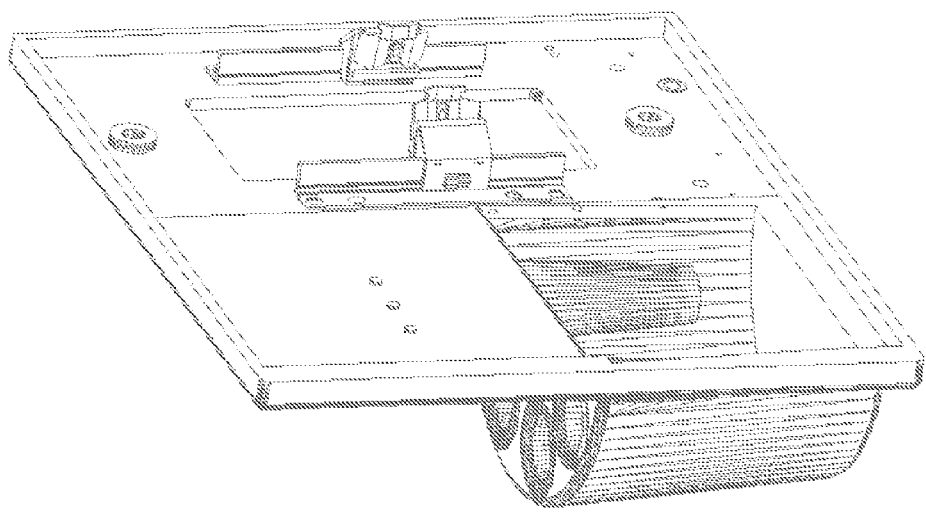
FIG. 21 is a diagram depicting a rear view of an inductive charger for appliances and personal electronics configured to be adjoined to an electrical receptacle.

FIG. 21 is a diagram depicting a rear view of an inductive charger 2100 for appliances and personal electronics configured to be adjoined to an electrical receptacle configured with a mode throttling device. According to examples, inductive charger 2100 may include receptacles for inserting or otherwise coupling one or more appliances or personal electronics for charging or communication with inductive charger 2100. Exemplary appliances and personal electronics which may be charged or coupled with inductive charger 2100 may include, headphones and earbuds, toothbrushes, curling irons, electrical shaving devices, electric nail grooming appliances, hair dryers, e-cigarettes (e.g., vaporizers), etc. Although inductive charger 2100, as illustrated, is indicative of a toothbrush or vaporizer charger, it should be understood that it may comprise other forms which may suitably fit other appliances and personal electronics. Additionally or alternatively, inductive charger faceplates and adapters may be configured to fit an electrical receptacle and/or an inductive charger fit on an electrical receptacle, in accordance with the examples described herein.

Figure 22:
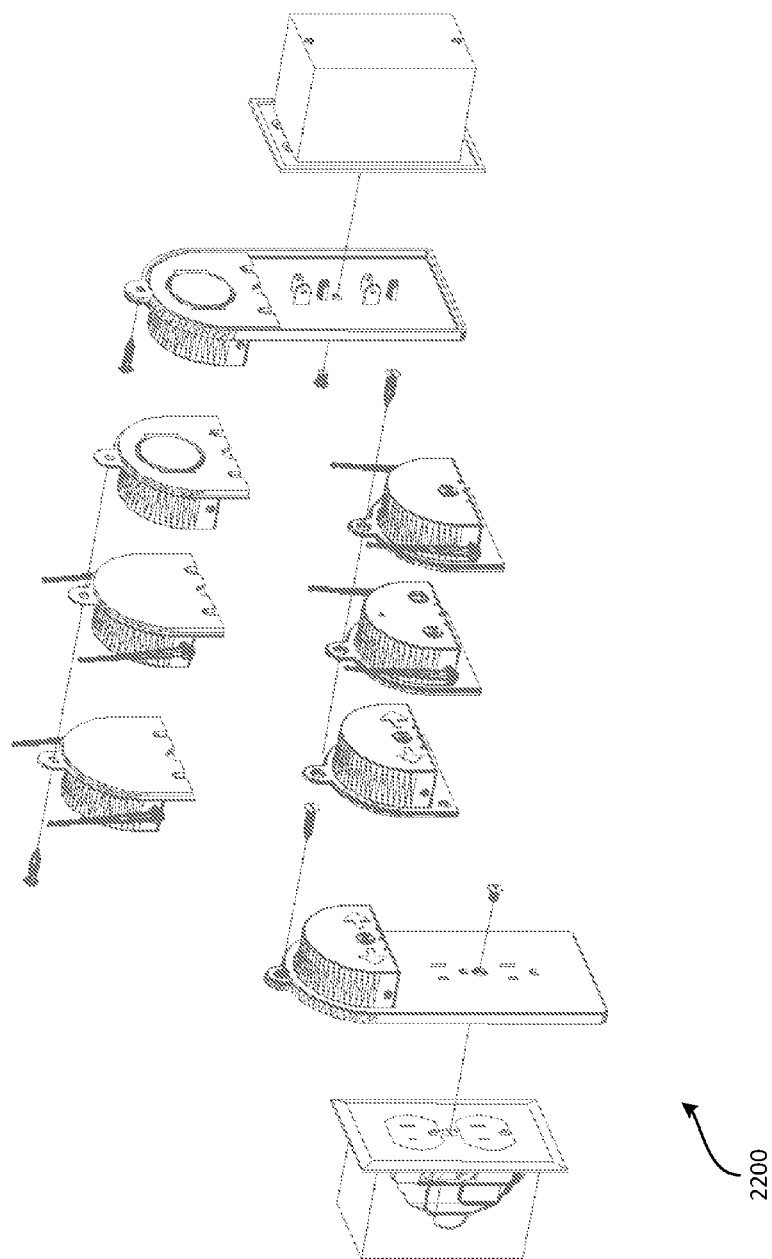
FIG. 22 is a diagram depicting exploded front and rear views an electrical receptacle cover integrated with a speaker system and radio frequency (RF) extenders.

FIG. 22 is a diagram depicting exploded front and rear views an electrical receptacle cover 2200 integrated with a mode throttling device, and radio frequency (RF) extenders.

What is claimed is:

1. An electrical receptacle cover assembly comprising:
  an electrical receptacle cover:
    a first transmission tab extending from the electrical receptacle cover and configured to be electrically connected to a neutral terminal screw located on a side of an electrical receptacle;
    a second transmission tab extending from the electrical receptacle cover and configured to be electrically connected to a live terminal screw located on an opposing side of the electrical receptacle;

a speaker device in electrical communication with the first and second transmission tabs; and a portion including an electrical receptacle cover mounting aperture for fastening the electrical receptacle cover to the electrical receptacle; and a speaker grille cover removeably connected to the receptacle cover and configured to conceal at least the portion of the electrical receptacle cover containing the electrical receptacle mounting aperture.

2. The electrical receptacle cover assembly of claim 1, further comprising a gasket mounted to the rear portion of the electrical receptacle cover, the gasket configured to provide a seal between the electrical receptacle cover, the electrical receptacle, and a receptacle box.

3. The electrical receptacle cover assembly of claim 1, wherein the speaker grille cover is connected to the electrical receptacle cover via one or more external speaker grille cover mounting apertures and one or more internal speaker grille cover mounting apertures.

4. The electrical receptacle cover assembly of claim 3, wherein the speaker grille cover is connected to the receptacle cover via an internal magnetic component and an external magnetic component.

5. The electrical receptacle cover assembly of claim 1, further comprising a camera.

6. The electrical receptacle cover assembly of claim 5, wherein the camera is integrated with a photosensor.

7. The electrical receptacle cover assembly of claim 6, wherein the camera is integrated with a communicative device for receiving and transmitting wireless signals.

8. The electrical receptacle cover assembly of claim 7, wherein the communicative device is capable of receiving, transmitting, and processing Bluetooth signals.

9. The electrical receptacle cover assembly of claim 7, wherein the communicative device is capable of receiving, transmitting, and processing WiFi signals.

10. The electrical receptacle cover assembly of claim 7 wherein the communicative device receives wireless signals from a doorbell and provides a visual indication when the doorbell has been utilized.

11. The electrical receptacle cover assembly of claim 1, further comprising a microphone.

12. The electrical receptacle cover assembly of claim 11, wherein the microphone is integrated with an audiosensor.

13. The electrical receptacle cover assembly of claim 12, wherein the microphone is integrated with a communicative device for receiving and transmitting wireless signals.

14. The electrical receptacle cover assembly of claim 13, wherein the communicative device is capable of receiving, transmitting, and processing Bluetooth signals.

15. The electrical receptacle cover assembly of claim 13, wherein the communicative device is capable of receiving, transmitting, and processing WiFi signals.

16. The electrical receptacle cover assembly of claim 1, further comprising a light emitting device integrated with a communicative device for receiving and transmitting wireless signals.

17. The electrical receptacle cover assembly of claim 16, wherein the light emitting device is integrated with a motion sensor.

18. The electrical receptacle cover assembly of claim 16, wherein the communicative device is capable of receiving, transmitting, and processing Bluetooth signals.

19. The electrical receptacle cover assembly of claim 16, wherein the communicative device is capable of receiving, transmitting, and processing WiFi signals.

20. An electrical receptacle cover assembly comprising:
an electrical receptacle cover having a front face, the electrical receptacle cover comprising:
a first transmission tab extending from the electrical receptacle cover and configured to be electrically connected to a neutral terminal screw located on a side of an electrical receptacle;
a second transmission tab extending from the electrical receptacle cover and configured to be electrically connected to a live terminal screw located on a same or an opposing side of the electrical receptacle;
a speaker device in electrical communication with the first and second transmission tabs;
an electrical receptacle cover mounting screw aperture arranged in a front face of the electrical receptacle cover; and
a speaker grille cover removeably connectable to the electrical receptacle cover and comprising one or more external speaker grille cover mounting apertures located in one or more peripheral sides of the speaker grille cover for mounting the external speaker grille cover onto the electrical receptacle cover using one or more fasteners, and wherein when the speaker grille cover is mounted to the electrical receptacle cover, the speaker grille cover conceals the electrical cover mounting screw.

21. An electrical box cover assembly comprising:
an electrical box cover comprising:
a first transmission tab extending from the electrical box cover and configured to be electrically connected to a neutral terminal screw located on a side of a switch;
a second transmission tab extending from the switch electrical box cover and configured to be electrically connected to a live terminal screw located on a same side or an opposing side of the switch;
a speaker device in electrical communication with the first and second transmission tabs;
a switch aperture; and
a portion including an electrical box cover mounting aperture for fastening the switch electrical box cover to the switch; and
a speaker grille cover removeably connected to the electrical box cover and configured to conceal at least the portion containing the electrical box cover mounting aperture.

* * * * *